(12) United States Patent
Stewart et al.

(10) Patent No.: US 10,187,494 B2
(45) Date of Patent: Jan. 22, 2019

(54) GATEWAY DEVICE APPLICATION DEVELOPMENT SYSTEM

(75) Inventors: Brett B. Stewart, Austin, TX (US); Dirk D. Heinen, Austin, TX (US); Margo A. Baxter, Austin, TX (US)

(73) Assignee: Acumera, Inc., Austin, TX (US)

( * ) Notice: Subject to any disclaimer, the term of this patent is extended or adjusted under 35 U.S.C. 154(b) by 1967 days.

(21) Appl. No.: 13/450,625

(22) Filed: Apr. 19, 2012

(65) Prior Publication Data

US 2012/0278454 A1 Nov. 1, 2012

Related U.S. Application Data

(60) Provisional application No. 61/479,105, filed on Apr. 26, 2011.

(51) Int. Cl.
*H04L 29/08* (2006.01)

(52) U.S. Cl.
CPC ............ *H04L 67/34* (2013.01); *H04L 67/125* (2013.01); *H04L 67/303* (2013.01)

(58) Field of Classification Search
CPC ...... H04L 67/34; H04L 67/125; H04L 67/303
USPC ................. 709/201, 203, 220, 223
See application file for complete search history.

(56) References Cited

U.S. PATENT DOCUMENTS

| | | | |
|---|---|---|---|
| 5,950,437 A | 9/1999 | Turner et al. | |
| 6,089,146 A | 7/2000 | Nam et al. | |
| 6,225,908 B1 | 5/2001 | Lee et al. | |
| 6,555,789 B2 | 4/2003 | Owens et al. | |
| 6,859,745 B2 | 2/2005 | Carr et al. | |
| 6,970,100 B2 | 11/2005 | Lovegreen et al. | |
| 7,034,689 B2 | 4/2006 | Teplitxky et al. | |
| 7,551,071 B2 | 6/2009 | Bennett, III et al. | |
| 7,694,005 B2 | 4/2010 | Reckamp et al. | |
| 7,724,154 B2 | 5/2010 | Stewart et al. | |
| 8,099,332 B2 | 1/2012 | Lemay et al. | |
| 8,166,106 B2 | 4/2012 | Biggs et al. | |
| 8,190,275 B2 | 5/2012 | Chang | |
| 8,205,240 B2 * | 6/2012 | Ansari ............... | G06Q 30/04 709/225 |

(Continued)

OTHER PUBLICATIONS

U.S. Appl. No. 12/425,870, filed Apr. 17, 2009, inventors Brett B. Stewart and Charles D. Golson.

*Primary Examiner* — Minh Chau Nguyen
(74) *Attorney, Agent, or Firm* — Meyertons Hood Kivlin Kowert & Goetzel, P.C.; Jeffrey C. Hood

(57) ABSTRACT

Configuring and managing gateway devices. A gateway device may be installed at a location, such as a merchant location or home. The gateway device may manage (e.g., monitor and/or control) one or more devices at the location. For example, the gateway device may manage various fuel tank devices, point of sale devices, refrigeration devices, liquid dispensing devices, etc., at a convenience store. The gateway device may provide reported information to and receive commands from a cloud server, which may be in communication with other devices which may be used to view reported information of or control the managed devices. The cloud server may also be configured to install applications, e.g., for execution by the cloud server, the gateway device, and/or other devices. For example, the gateway device may install applications provided by the cloud server to manage the devices coupled to the gateway device.

79 Claims, 31 Drawing Sheets

(56) References Cited

U.S. PATENT DOCUMENTS

| | | | |
|---|---|---|---|
| 8,219,558 B1 | 7/2012 | Trandal et al. | |
| 8,234,692 B2 | 7/2012 | Cortes et al. | |
| 8,239,772 B2 | 8/2012 | Fujioka et al. | |
| 8,301,270 B2 | 10/2012 | Quail | |
| 8,516,477 B1 * | 8/2013 | Kearns | G06F 8/65 717/174 |
| 8,782,637 B2 * | 7/2014 | Khalid | G06F 8/61 718/1 |
| 2002/0040564 A1 | 4/2002 | Killingbeck et al. | |
| 2005/0248455 A1 | 11/2005 | Pope et al. | |
| 2005/0258961 A1 | 11/2005 | Kimball et al. | |
| 2006/0033630 A1 | 2/2006 | Lyall | |
| 2006/0089965 A1 * | 4/2006 | Fontes | H04L 45/00 709/203 |
| 2006/0122852 A1 | 6/2006 | Moudy | |
| 2006/0164239 A1 | 7/2006 | Loda | |
| 2006/0214788 A1 | 9/2006 | Ku et al. | |
| 2009/0019535 A1 * | 1/2009 | Mishra | G06Q 10/00 726/12 |
| 2009/0138958 A1 * | 5/2009 | Baum | H04L 12/2809 726/12 |
| 2009/0168787 A1 * | 7/2009 | Ansari et al. | 370/401 |
| 2010/0023865 A1 * | 1/2010 | Fulker | G06F 3/04817 715/734 |
| 2010/0058319 A1 * | 3/2010 | Kawaguchi | G06F 8/63 717/172 |
| 2010/0202450 A1 * | 8/2010 | Ansari et al. | 370/389 |
| 2010/0245107 A1 * | 9/2010 | Fulker | G06F 17/30873 340/691.6 |
| 2011/0126255 A1 * | 5/2011 | Perlman | H04N 7/24 725/116 |
| 2011/0251992 A1 * | 10/2011 | Bethlehem | H04L 12/2863 707/610 |

* cited by examiner

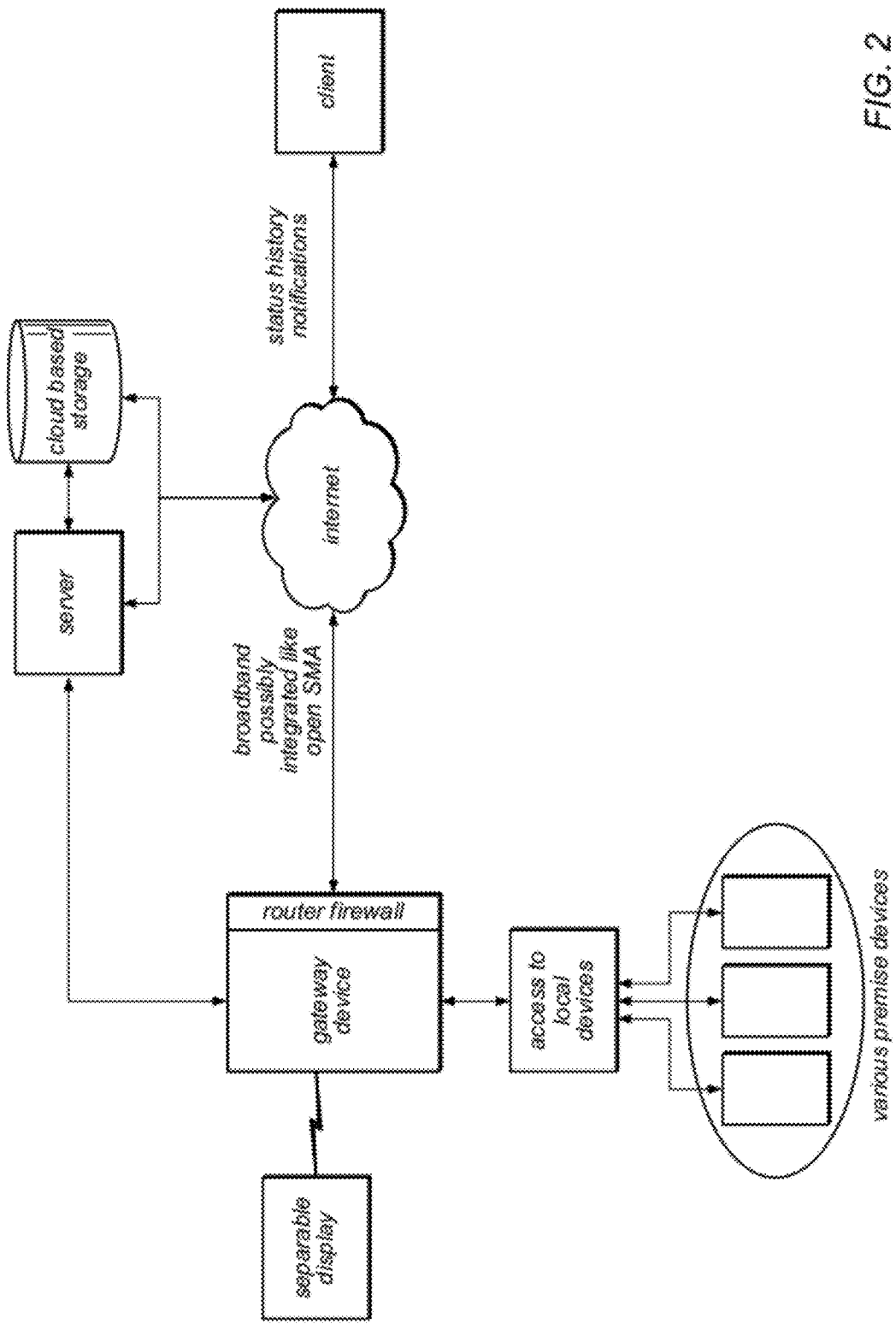

FIG. 13A

My Sites

Gas Plus Super Mart

180 ON NEXT

View as: Map | List | Blocks

| Status | Location Name ↓ | Location | Carrier | Serial Number | | | |
|---|---|---|---|---|---|---|---|
| 2 minutes ago | 418 | Lubbock TX | AT&T | 004fac0006d | ● | ◐ | ◁ |
| 3 minutes ago | 420 | Lubbock TX | AT&T | 004fac0007e | ● | ◐ | ◁ |
| 5 minutes ago | 421 | Lubbock TX | AT&T | 004fac00057 | ● | ◐ | ◁ |
| 2 minutes ago | 422 | Lubbock TX | AT&T | 004fac0006f | ● | ◐ | ◁ |
| 1 minute ago | 423 | Lubbock TX | AT&T | 004fac00056 | ● | ◐ | ◁ |
| 2 minutes ago | 424 | Lubbock TX | AT&T | 004fac0060 | ● | ◐ | ◁ |
| 1 minute ago | 500 | Big Spring TX | AT&T | 004fac00061 | ● | ◐ | ◁ |
| 5 minutes ago | 501 | Big Spring TX | Westex Telecom | 004fac00052 | ● | ◐ | ◁ |
| 2 minutes ago | 502 | Big Spring TX | AT&T | 004fac0004a | ● | ◐ | ◁ |
| 5 minutes ago | 503 | Big Spring TX | AT&T | 004fac00047 | ● | ◐ | ◁ |
| 1 minute ago | 505 | Big Spring TX | AT&T | 004fac00036 | ● | ◐ | ◁ |
| 2 minutes ago | 506 | Big Spring TX | AT&T | 004fac00069 | ● | ◐ | ◁ |
| 2 minutes ago | 507 | Big Spring TX | AT&T | 004fac00036 | ● | ◐ | ◁ |

Tools ▾

Configuration for Gas Plus Abilene 045

Temp Sensors

| Label | Sensor ID | Description | Ranges | | | Units |
|---|---|---|---|---|---|---|
| Frozen1 | 1001 | Frozen/Novelty Ice Cream | ok -10--4 | warning -4--10, -4-0 | critical <-15, >0 | Fahrenheit |
| MidTemp1 | 995 | MidTemp Vault | ok 35-38 | warning 34-35, 38-41 | critical <34, >41 | Fahrenheit |
| MidTemp2 | 996 | MidTemp Reach-In Storage | ok 35-38 | warning 34-35, 38-41 | critical <34, >41 | Fahrenheit |
| Ambient1 | 997 | Ambient Store Temp | ok 50-70 | warning <50, >70 | critical | Fahrenheit |
| Frozen2 | 1000 | True Ref/Frozen Storage | ok -10--4 | warning -4--10, -4-0 | critical <-15, >0 | Fahrenheit |
| Ambient2 | 998 | All/Additional Ambient | ok 50-70 | warning <50, >70 | critical | Fahrenheit |
| Def | 999 | Open Def | ok 35-38 | warning 34-35, 38-41 | critical <34, >41 | Fahrenheit |
| Reg Unld | 992 | Reg Unld | ok >10 | warning 5-10 | critical 0-5 | Percent |
| Sup Unld | 993 | Sup Unld | ok >10 | warning 5-10 | critical 0-5 | Percent |
| Diesel | 994 | Diesel | ok >10 | warning 5-10 | critical 0-5 | Percent |

Add new sensor...

(Save Sensor Configuration)

Gas Plus | Tools ▾

Administrator
Logout|Help|Feedback
→ Powered by Acumera

275 | 1 | 7 | 2 | 1 | 11 | 9:56 am 280 On Net

Search...

Support for Gas Plus

All Open Tickets at Gas Plus (2)
View: My Open Tickets | All Open | Closed

✚ Open New Ticket

| Subject | Location | Open For | Last Updated By ▾ | Assigned To |
|---|---|---|---|---|
| ● #03132 *MG Not Reporting (7)* | Gas Plus 233 | 1 days | Chris Michaels 1 minute ago | Mark Wagner |
| ● #03110 *Range and Bandwidth of Pico Stations Needs to be Increased (2)* | Gas Plus | 3 days | Mark Wagner 9:06 am 05/15 | Mark Wagner |

*FIG. 14B*

GATEWAY DEVICE APPLICATION DEVELOPMENT SYSTEM

This application claims benefit of priority of U.S. provisional application Ser. No. 61/479,105 titled "Gateway Device Application Development System" filed Apr. 26, 2011, whose inventors were Brett B. Stewart, Dirk D. Heinen, Margo A. Baxter, and Thomas E. Yemington, which is hereby incorporated by reference in its entirety as though fully and completely set forth herein.

FIELD OF THE INVENTION

Field of the Invention

The present invention generally relates to software application development and deployment on remote devices, and more specifically to systems and methods for configuring or managing gateway devices at various locations.

Description of the Related Art

Merchants, such as gas stations or convenience stores, often have to manage or monitor many different premise devices (devices at a location or premises) in order to properly operate. For example, a gas station may use several refrigeration units, point of sale (POS) devices, food or drink dispensing machines, electronic signs, fuel tank monitors, etc. It may be difficult for employees or managers of the gas station to perform their day to day activities as well as monitor the status of all of these different premise devices. For example, the temperature of many convenience store refrigeration units may exceed safe or desirable temperatures for food items stored in the refrigeration units, especially ones that can easily spoil. Further, other than spot checking these conditions or devices, a manager of many stores often has difficulty verifying that store managers are properly monitoring or maintaining all of these premise devices. Similar problems exist for different types of merchants, including department stores, retail stores, grocery stores, etc. Additionally, these problems can also be extended to users in their own home, e.g., for managing various computer devices, refrigerators, lights, swimming pools, HVAC equipment, entertainment equipment, plug in automobiles, solar power generation equipment, power meters, etc.

Accordingly, improvements in monitoring and controlling devices are desired.

SUMMARY OF THE INVENTION

Various embodiments are described of a system and method for configuring or managing premise devices at various locations (e.g., merchant locations), using gateway devices.

One or more gateway devices may be installed at various locations. For example, a first gateway device may be installed at a merchant location, such as a convenience store. A second gateway device may be installed at a different merchant location, e.g., a different convenience store operated by the same or different merchant. As another example, gateway devices may be installed at respective users' homes. The gateway devices may be installed in any location where a user or entity wishes to manage (e.g., monitor and/or control) premise devices at the location.

Each gateway device may be coupled to a plurality of premise devices at the location. For example, the gateway device and the plurality of premise devices may be connected to a same network (e.g., a local area network, possibly provided by the gateway device). The premise devices may be any type of device. For example, a convenience store may include refrigeration devices, cooking devices, point of sale (POS) devices, electronic signs, fuel tank monitoring devices, etc. A home may include various lighting devices, A/C or heating devices, refrigerators, security systems, audio/video systems, gaming consoles, electricity systems, etc.

The gateway device may also be coupled to a server (e.g., a cloud server) over a wide area network, such as the Internet. It is noted that references to "server" herein may refer to a dedicated server or a cloud server. The server may be used to configure and/or control the gateway device (or premise devices coupled to the gateway device). More specifically, in some embodiments, in order to manage these different premise devices, applications may be developed for execution on gateway devices (or devices coupled to a gateway device). For example, a server may host various ones of these applications and may facilitate selection and deployment of these applications on the gateway device, or devices coupled to the gateway device. In another embodiment, applications may be developed that execute on a server coupled to a gateway device, where the application executes on the server to manage or control a gateway device (and/or devices associated with the gateway device), or multiple gateway devices. The application may instead execute on the server to manage or control premise devices that are connected to one or more gateway devices.

For example, a software development kit (SDK) or application programming interface (API) may be used to develop applications that can be installed on the gateway device. As noted above, these applications may also be executable by other devices as well. For example, the applications may be executable by the gateway device, a server, and/or other devices (e.g., user devices). The applications may be used to communicate with and control the premise devices at the location, to present data gathered by the premise devices (e.g., related to the premise devices themselves, the environment around the premise devices, etc.), to provide an interface for viewing data or controlling premise devices, and/or to manage or view data corresponding to the location of the gateway device, among other possibilities. The applications may be configured for any possible use regarding the gateway device (or multiple gateway devices), including use by the premise devices managed by the gateway device, presentation of data of the gateway device, presentation of data of the premise devices, presentation of data regarding (e.g., from) a plurality of different gateway devices, presentation of data from different locations (e.g., as gathered from the gateway devices), etc. Accordingly, the applications may be selected and installed on the various devices.

These applications may be developed and uploaded to a server, referred to as an application server. The application server may execute software to operate as an "application store". The applications described herein are also referred to as "packages", and thus the server may be said to host a "package store" or "PACKAGE WAREHOUSE™". Thus various different application developers (or "package developers") may create various different applications that the upload to the application server for purchase by customers (e.g., merchants) who are operating gateway devices.

The applications may be selected for installation in various manners. For example, the applications may be selected for installation manually, via user selection. In one embodiment, the application server hosting the application store maintains a website for the application store (or otherwise presents a user interface) that is accessible by various client systems, e.g., over the Internet. A user may browse (using a web browser) through a plurality of available applications in the application store and then select desired applications for installation, e.g., on the gateway device, the server, and/or other devices. The user may also specify the targets for installation of the selected applications, although this may be determined automatically, as desired. Alternatively, or additionally, the applications may be selected for installation in an automatic fashion.

For example, the gateway device may provide identification information of the premise devices coupled to the gateway device. In one embodiment, the gateway device may automatically discover these premise devices and then provide corresponding identification information to the application server. The application server may in turn automatically select appropriate applications based on the identification information of the premise devices. These applications may, for example, allow the gateway device to communicate with and/or control the premise devices coupled to the gateway device. The applications may also be used to aggregate and/or present data (e.g., of the environment in the location) gathered by the various premise devices.

In another embodiment, an application configuration may be automatically determined for the gateway device. The application configuration may be a default application configuration that is associated with the entity or merchant that operates the gateway device, a default application associated with the type of location of the gateway device, etc. The application configuration may also be automatically generated based on other application configurations (e.g., based on the plurality of applications installed on other gateway devices). For example, an application configuration may be generated based on the plurality of applications installed on (or otherwise associated with) other similar gateway devices (e.g., that are also associated with the same entity).

Once the gateway device has been configured with one or more applications, and hence has the ability to manage the coupled premise devices (e.g., via the installed applications), it may provide information reported by the premise devices to a server and/or control the premise devices in response to messages. For example, the reported information may be presented to a user, e.g., via the server. In one embodiment, the server may provide that information to a user that has logged in to the server (e.g., a website of the server). Alternatively, or additionally, the server may provide reported information to a device of the user (e.g., such as a cell phone or device controlled by the user), which may execute an application (or a plurality of applications) for providing an interface to the server or gateway device. In further embodiments, the user may be able to receive reported information and control various devices via a device coupled to the gateway device, e.g., via local area connection, such as when the Internet is down. In some embodiments, the applications described above may be executed in a distributed fashion, e.g., among the gateway device, the server, and/or other devices, such as user devices.

In addition, as noted above, the server which interfaces to a respective gateway device may be configured with one or more applications to allow it to manage the gateway device (or multiple gateway devices), manage premise devices coupled to the gateway devices, receive and process data received from one or more gateway devices, etc. For example, applications executing on the server (or the gateway device) may retrieve data for a respective managed device and provide that data for display. In some embodiments, the application may retrieve data for a respective premise device from another source (e.g., not from the premise device or possibly even the gateway device managing the premise device) and provide this data for display, while indicating that the data relates to the particular premise device. As one example, instead of receiving the information from the premise device or gateway device, information regarding the premise device may be provided from a third party, e.g., which stores information related to the premise device. Thus, information related to the premise device may be received from any number of sources, as desired.

As indicated above, reported information or notifications may be provided to users or devices. For example, certain users may wish to receive reported information or notifications of reported information of the devices managed by the gateway device. This information may be provided to users, e.g., via devices of each user. For example, each user may have a plurality of devices for receiving the reported information. The user may set up rules for determining when and what type of reported information should be provided. Examples of the reported information rules may be, e.g., provision of all of the information, only for specific devices, only during certain time intervals (such as during work hours), only when there is an alarm condition, only when user action is required, etc. The user may also set up rules for determining which of the devices should receive the notification (e.g., specifying a default device, specifying based on various conditions, such as work schedule, vacation schedule, location of the user, location of the user's devices, etc.) as well as how the notification should be received (e.g., email, text message, phone call, instant message, etc.). Note that the reported information or notifications may be provided to devices that are not associated with users as well. For example, such information may be provided to a computer system that is present at the location, but may not be associated with any particular user. The same possibilities for rules apply to devices not associated with users.

Thus, embodiments of the invention may provide a much more convenient and powerful mechanism for enabling merchants to manage and control the various premise devices in their store. For example, by managing the premise devices at the location, a user may be able to monitor and/or control the environment at the location (e.g., temperature, security, lighting, music, etc.). In particular, embodiments may provide a platform for application developers to create and provide for sale application programs used for monitoring and/or controlling premise devices, such as premise devices commonly found at a merchant location. Further, embodiments may provide a convenient platform for customers/merchants to browse and select application programs for deployment and execution on their merchant gateway devices (or servers or managed devices) for monitoring/controlling the various premise devices present in their merchant location.

BRIEF DESCRIPTION OF THE DRAWINGS

A better understanding of the present invention may be obtained when the following detailed description is considered in conjunction with the following drawings, in which:

FIGS. 2 and 3 are block diagrams of exemplary systems, according to some embodiments;

Figure 1A:
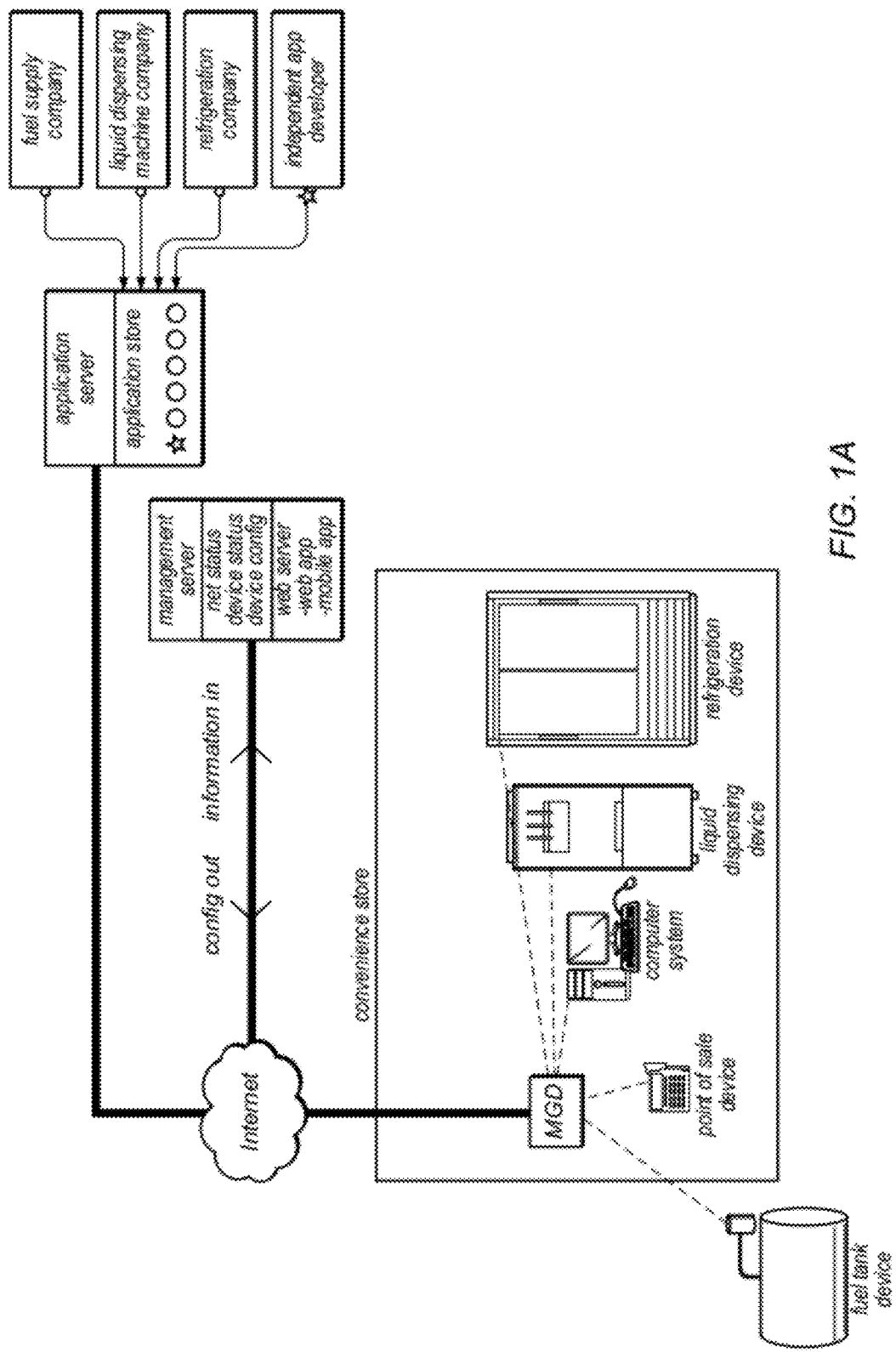
FIGS. 1A and 1B illustrate two exemplary systems, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Patent Application titled "Multiserver Merchant Gateway", Ser. No. 11/267,566, which was filed Nov. 4, 2005, whose inventors are Brett B. Stewart and Charles O. Golson, U.S. Pat. No. 7,724,154, titled "System and Method for Food Service Storage Bin Monitoring", which was filed Oct. 30, 2006, whose inventors work Brett B. Stewart and Drik D. Heinen, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Gateway Device—refers to a device that is configured to couple to a wide area network, such as the Internet, and also couple (either wired or wirelessly) to one or more devices, and which is configurable with one or more application programs to monitor and/or control the one or more devices. The term "Merchant Gateway Device" refers to a Gateway Device that is configured to be placed at a merchant location, e.g., which is configurable with one or more application programs to monitor and/or control one or more devices that would typically be located at a merchant location.

Figure 1B:
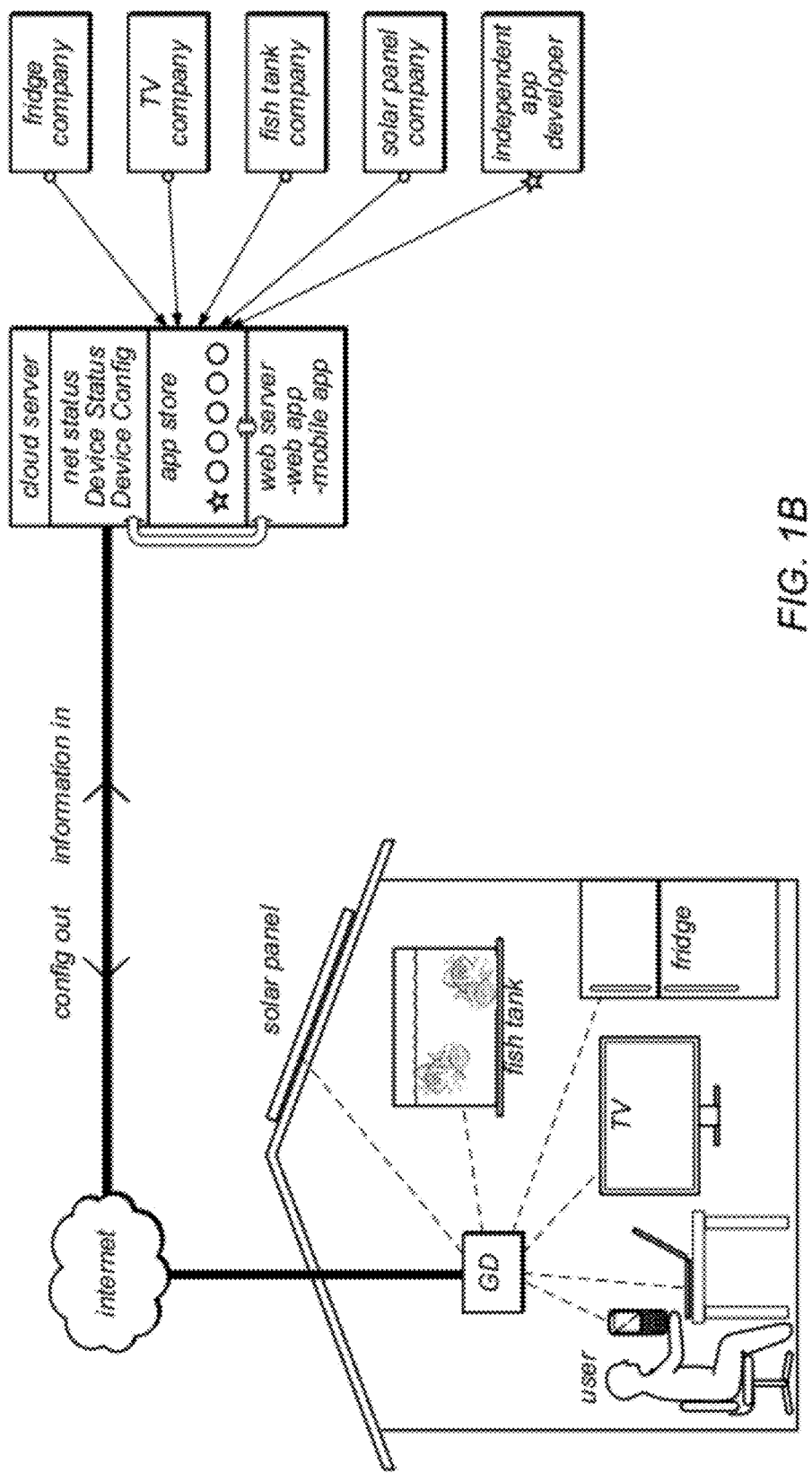

FIGS. 1A and 1B—Exemplary Systems

FIGS. 1A and 1B illustrate various exemplary systems that may implement embodiments described herein. However, these systems are exemplary only and other systems and configurations are envisioned.

In FIG. 1A, an exemplary merchant location (in this case, a convenience store) is illustrated. The convenience store includes a gateway device (in this case, a "merchant gateway device", shown as "MGD"), which may manage various premise devices of the convenience store. As used herein, "management of devices" (or similar phrases) refers to monitoring and/or controlling devices. For example, management may include receiving information gathered by the devices (e.g., status information or reported information) and/or modifying operation of the devices (e.g., by providing control messages). As shown, the gateway device may be coupled (in a wired or wireless fashion) to various premise devices in the convenience store. The gateway device may be installed at the location in a relatively straightforward manner. For example, the gateway device may simply be screwed into the wall and connected to a local Internet connection or network connection. In some embodiments, the gateway device may be a ruggedized device and may be stored in an electrical closet.

The various premise devices to which the gateway device may be coupled include: one or more point of sale devices (POSs, such as credit card readers for purchasing fuel, e.g., located at the pump, or items sold by the convenience store, e.g., located in the store), one or more liquid dispensing devices (e.g., a Slurpee™ machine, coffee dispenser, fountain drink dispenser, etc.), one or more refrigeration devices (e.g., for cooling various food or drink items), or one or more fuel tank devices (e.g., for monitoring the level of fuel in the tank, dispensing the fuel to customers, etc.). The gateway device may manage other premise devices than those shown in FIG. 1A; for example, the gateway device may manage vending machines (e.g., for food items or other types of items, such as movies, devices, peripherals, etc.), heating devices (e.g., for keeping food items hot, such as hot dogs), washing devices (e.g., car washes or laundry machines), electronic signs (e.g., advertising the price of the gas at the convenience store, among other possibilities), ATM machines, air conditioning units or heating units of the convenience store, store security devices/systems (e.g., cameras or alarm systems, etc.), ice machines, soft serve dispensing machines, cash registers, safes, any local computers or servers, the local area network of the convenience store, any network connection(s) (e.g., the Internet) of the convenience store, wireless network(s), etc.

As indicated above, the gateway device may monitor or control these various premise devices. For example, the gateway device may monitor the temperature inside or near a refrigeration device. The gateway device may be further configured to control the refrigeration device, e.g., by turning on the refrigeration when the temperature readings are too high (e.g., when the temperature is outside of food safety levels), providing an alert when the refrigeration device is working improperly, etc. Note that while the gateway device may interact directly with the refrigeration device, e.g., where the refrigeration device includes circuitry that is intelligent enough to communicate with other devices, the gateway device may alternatively interact with various sensors that are coupled or connected to the refrigeration device. For example, the gateway device may be in communication with a temperature sensor inside the refrigeration device in order to monitor the temperature of the refrigeration device. In some embodiments, the gateway device may monitor food storage bins, such as in the manner described in U.S. Pat. No. 7,724,154, which was incorporated in its entirety above. Other devices that do not include communication circuitry (or other required circuitry) may be monitored via sensors as well.

As another example, the gateway device may manage a fuel tank device. For example, the fuel tank device (or a sensor within the fuel tank) may provide reported information, such as readings indicating the level of fuel stored in the fuel tank. The gateway device may monitor the status of the liquid dispensing device. For example, the gateway device may monitor the status of various nozzles that dispense different liquids, the status of the level of ice in the liquid dispensing device, the temperature of the liquid stored in or provided by the liquid dispensing device, the level of liquid stored in the liquid dispensing device, etc. Again, as noted above, the gateway device may monitor one or more sensors coupled to the liquid dispensing device to accomplish the above functions.

Additionally, the gateway device may manage various POS devices at the convenience store. For example, the gateway device may monitor or control POS devices that are at the gas pump(s) of the convenience store, POS devices at a cash register of the convenience store, etc. The gateway device may monitor transactions that are performed by the POS devices. In some embodiments, the gateway device may perform the functionality described in U.S. patent application Ser. No. 11/267,566, which was incorporated by reference in its entirety above. Thus, the gateway device may manage any type of device that it is coupled to.

Generally, while the above descriptions are specific to monitoring devices of the location, the methods herein may relate to monitoring the environment or specific conditions of the location where the gateway device resides. For example, while a refrigerator may be the device that is being monitored, the temperature sensors may simply report the temperatures at specific locations inside the refrigerator in order to report the condition of that area in the location. Thus, while descriptions herein focus on the status or condition of individual premise devices, ultimately, the information may relate to specific conditions or environments of the location. Thus, the reported information provided from a device may reflect the environment of the location near the device (e.g., as measured by the device), although it can also include status or condition information of the device itself, depending on the type of device or measurement.

As shown, the gateway device may be in communication with a network, e.g., a wide area network (WAN), such as the Internet. The gateway device may be in communication with the Internet via a router or modem that provides the Internet connection. Alternatively, the gateway device may itself include logic (e.g., circuitry such as an ASIC or FPGA and/or a processor and memory storing program instructions) to perform these wide area network connectivity functions. For example, the gateway device may include a broadband modem for providing a communication link between the convenience store and the Internet. The gateway device may also act as a router (e.g., a wired and/or wireless router) which couples to the wide area network and premise devices at the location.

In one embodiment, the gateway device may provide a local area network (LAN) that at least a subset of the premise devices may connect to, e.g., in order to communicate with the gateway device and/or the Internet. The gateway device may provide a wireless hotspot for the convenience store, e.g., which may be accessible by employees of the convenience store and/or customers of the convenience store, as desired. In further embodiments, the gateway device may include security software or circuitry, e.g., to provide a firewall for the Internet connection, perform communication encryption, protect credit card information provided over the network connection, etc.

As also shown, the gateway device may be in communication with a computer system in the convenience store (e.g., in a wired or wireless fashion, as desired). For example, a manager or employee of the convenience store may use the computer system to perform various tasks related to the convenience store, e.g., viewing security feeds, performing bookkeeping, etc. In some embodiments, the gateway device may be configured to manage the computer system. In one embodiment, the gateway device may monitor various programs that are executing on the computer system and/or the Internet traffic that the computer system is receiving or transmitting, among other possibilities.

Alternatively, or additionally, the computer system in the convenience store may be used to manage or monitor the various programs executing on the gateway device. For example, the gateway device may provide status messages (e.g., containing reported information) or control messages (e.g., for controlling one or more devices) regarding the plurality of devices of the convenience store to the computer system. For example, an employee or manager of the store may monitor or control the various devices of the store using an application that executes on the computer system and which is in communication with the gateway device. For example, the gateway device may include a web server that hosts a website used for these monitor/control functions. The computer system may execute a web browser and may visit the website (e.g., hosted by the gateway device or elsewhere) that is usable to manage the devices at the convenience store. Alternatively, a custom application may be executed by the computer system to manage the devices via the gateway device. Note that while the computer system is shown as a typical desktop computer system, any type of system may be used, e.g., laptop computers, portable or mobile devices, such as cell phones, netbook computers, tablet computers, etc. In general, in this embodiment, the computing system may be any device that is able to provide an interface to the gateway device for a user. For example, it may simply be a separate display that is able to display information provided by the gateway device (e.g., over a wireless network).

The computer system may be in communication with a server, referred to as a management server (e.g., a cloud server, as described below). The management server may be located on the Internet, or may be in direct communication with the gateway device (e.g., without accessing the Internet), and/or both, as desired. The gateway device may be in direct communication with the management server to report information gathered by the devices or perform control actions, among other possibilities. A user may be able to configure the gateway device directly (e.g., via a web site hosted by the gateway device or via an application executing on the computer system) or may be able to configure the gateway device over the Internet, via the management server.

As shown in FIG. 1A (and as discussed above), the gateway device may be in communication with one or more servers (e.g., which may be a single server or a server farm, as desired) over the Internet connection. The one or more servers (which may be a "cloud server" or "cloud servers") may provide various functionality for the convenience store, the gateway device, and/or other devices or users, as desired.

For example, the management server may be configured to receive and store information regarding the premise devices managed by the gateway device and possibly status information of the gateway device or the convenience store. For example, the management server may store configuration information of the various premise devices, network status information of the connection between the management server and the gateway device, etc. In one embodiment, the management server may be configured to receive messages comprising information gathered from each of (or at least a subset of) the plurality of premise devices at the convenience store and store reported information for the premise devices, e.g., in a database. The reported information may indicate a current condition of the premise device, a condition of the environment of the location near the premise device, any data measured by the premise device, etc. For example, the management server may store the current temperature (and/or a history of temperatures) for a first refrigeration device at the convenience store. The management server may also receive messages regarding various transactions performed by a first POS device at the convenience store and store information regarding those transactions. The management server may also receive messages regarding the fuel level in a first fuel tank at the convenience store and store the current level (or a history of fuel levels) in response to the message. Other types of reported information or messages may be received by the management server.

In some embodiments, the management server may receive messages indicating specific alarms or events associated with the premise devices managed by the gateway device. For example, the gateway device may send information indicating when a temperature of the refrigeration device exceeds a threshold (e.g., based on food safety requirements or otherwise); when the fuel level in the fuel tank is below a threshold level; when the liquid dispensing device is low on a respective liquid, out of ice, etc.; when the POS performs or attempts to perform a transaction above a certain level, etc. The gateway device may also send information when a security alarm has been detected (e.g., when the convenience store is broken in to), when an employee triggers an alarm (e.g., when the convenience store is being robbed), etc.

In one embodiment, rather than the management server receiving indications of a specific alarm, the management server may be configured to automatically evaluate the incoming reported information to determine whether such conditions have arisen. For example, rather than receiving a message indicating that the fuel tank is below a certain level, the management server may be configured to compare the current fuel tank level (e.g., as reported in a status message) with a threshold to determine if the fuel tank has reached a refueling level. Similarly, the management server may be configured to compare a current temperature of a refrigerator with a threshold temperature to determine if the refrigerator is operating adequately and/or if the temperature is above food safety levels.

Note that while the reported information is provided to the management server by the gateway device, other entities or devices may provide reported information related to the convenience store (or generally, location of the gateway device) to the management server. For example, a third party server may provide information related to a device located at the location of the gateway device to the management server, and the management server may receive that data and report it for the location of the gateway device (e.g., as if it were provided from the gateway device). As one specific example, an energy company may store information related to the energy consumption of the convenience store in FIG. 1A, but that information may not be available to the gateway device (e.g., by being coupled to a smart sensor that monitors energy use of the convenience store). Accordingly, a server storing that energy information may be configured to provide the information to the management server, which can then include that information in an interface to a user. Thus, a user may be able to view the energy use information from the management server even though it was not provided via the gateway device. Accordingly, the management server may be configured to aggregate information concerning a location from a plurality of sources, including the gateway device and/or other entities that gather or store such data. As another example, a manufacturer of a device may send reported information (or alerts) based on schedules. For example, an ice machine manufacturer may send information to the management server to update the status to "replace filter" every on a periodic basis (e.g., every six months). This may be extended to any party or particular information related to the location (e.g., a device at the location). Further, weather information related to the location may be provided to the management server (e.g., from a weather service).

The management server may also be configured to provide information related to the convenience store to various users, entities, and/or devices (e.g., user devices). For example, the management server may receive information gathered by the various premise devices and may provide the information for display on a website that may be visited by authorized users (e.g., users that are associated with the specific convenience store). Alternatively, or additionally, these users (or other devices) may execute programs on computer systems or devices designed to interface with the management server to retrieve and provide the information for presentation for the user. In one embodiment, a manager of the convenience store may be able to execute such a program, or browse to a web site provided by the management server, to view the current status of the convenience store, e.g., as reported by the various premise devices. For example, the manager may be able to quickly determine the fuel level in the fuel tanks of the convenience store, determine whether the food sold at the convenience store are currently at proper temperatures (and/or if they have been over a period of time, such as the last day, last week, last month, or any period of time specified by the user), determine the current prices of the gas sold by the convenience store, determine the number or amount of sales performed by the convenience store over various time periods (such as those described above, although they can be specified manually by the user), etc.

Note that the computer system inside of the convenience store may similarly access the management server (or the gateway device) to determine the status of the convenience store (e.g., based on the reported information), as desired. Thus, the gateway device may monitor the status or condition of various premise devices in the convenience store (or generally various conditions within the convenience store, e.g., as reported by premise devices), provide them to the management server, and the management server may provide that information to various other entities or users, which may be local or remote to the location of the convenience store, as desired. Alternatively, the gateway device may include web server functionality, and thus the gateway device may be accessible by client browsers located on the computer system or the management server.

In some embodiments, the gateway device may actively push the information related to the various premise devices to the management server (e.g., rather than the management server requesting the information). Accordingly, the management server may receive the reported information from one or more gateway devices. The management server may report an issue or actively try to contact a gateway device (e.g., for pulling the data) if it has not "checked in" or reported information on its normal schedule (e.g., once a minute, once every 5 minutes, 10 minutes, 15 minutes, 30 minutes, 60 minutes, etc.). In alternate embodiments, the management server may send requests for information, e.g., on a periodic basis.

Similarly, the management server may actively push data (e.g., reported information or alerts) to various entities or users. For example, the management server may be configured to provide information to various users when alert or alarm conditions occur. As one example, the management server may be configured to notify any managers or employees of the convenience store when any general alarm condition is reached (e.g., when the fuel tank is below the threshold, after a fuel spill or other environmental hazard, when the refrigeration temperature is above a threshold, when the door of a refrigerator has been left open, etc.). The management server may then send messages to these users in various manners, e.g., through email, text messaging, instant messaging, phone calls, etc. Note that the management server may store more than one contact information or contact method for each user or device (e.g., including one or more email addresses, one or more phone numbers, one or more associated devices, etc.).

The management server may store contact information and conditions for a plurality of different users. For example, the management server may be aware of the work schedule of various employees and may only notify such employees when they are currently working. Thus, as one example, the cloud server may notify the day manager when alarm conditions are reached during the day, but may notify the night manager when alarm conditions are reached during the night. However, some users or entities may always be notified when such conditions are reached, e.g., including the computer system of the convenience store (to alert any nearby employees), a store owner, etc.

The management server may be configured to alert specific users or entities for specific premise devices at the convenience store. For example, the management server may be configured to request a fuel refill (e.g., by providing a delivery request to a gas delivery company) when the fuel tank level is below a threshold. Similarly, the management server may be configured to contact an IT support person when the local area network at the convenience store is no longer functioning, when the Internet connection from the gateway device is not functioning, when the computer system is malfunctioning, etc. Further, manufacturers of individual devices may be notified of the existence of and/or condition of various premise devices at the location. For example, the management server may notify a manufacturer when one of its devices is detected at a convenience store and may provide status or condition information of the device to the manufacturer (e.g., for information gathering, maintenance purposes, warranty purposes, etc.). Thus, rather than notifying users or entities in response to any event or status of the convenience store, some entities may only be notified based on reported information or alerts of a particular device at the convenience store. The management server may store rules in order to perform the notifications described above, e.g., in a database, as desired. Additionally, an administrator may be able to configure the notification rules, using an administrative interface for the convenience store. As one example, an administrator may configure various settings related to the gateway device, particular premise devices of the convenience store, and/or the convenience store via a website provided by the management server.

The management server may also allow for configuration of the gateway device or premise devices managed by the gateway device in the convenience store. For example, a manager may wish to update prices (e.g., of an electronic sign, a fuel dispenser, various food items, etc.) at the convenience store. For gas prices in particular, the manager may access the management server via an application executing on a computer system or device (such as a web browser or custom application) and set the gas prices displayed on electronic signs at the convenience store, the prices of gas at the fuel pumps (e.g., on the POS devices), etc. Thus, instead of the manager calling an employee of the convenience store to change all of these settings, the manager may simply change them remotely without interrupting any work at the convenience store. The manager (or any other authorized user) may be able to modify other settings as well. For example, the manager may change the current temperature of the convenience store by changing the desired temperature of heaters or coolers at the convenience store. The manager may be able to modify the temperatures of various refrigerator units, heating units, or the settings of any controllable device at the convenience store. The manager may be able to configure any device or setting at the convenience store using the management server.

In one embodiment, the management server may achieve various features described above by executing one or more "applications" or "packages" (described below as "applications") for use for the convenience store, in the example of FIG. 1A. Embodiments of the invention provide an improved system for developers to create and sell such applications and an improved system for users to browse and purchase such applications.

As described herein, an application server may store and/or provide a plurality of "applications" or "packages" (described below as "applications") for use for the convenience store, in the example of FIG. 1A. The application server may be the same server as the management server, or may be a different server. Each of the management server and the application server may be cloud servers. In the following description, the terms "server" and "cloud server" are used to refer generically either or both of the management server and the application server (and/or other associated servers)

For example, a manager may browse the application server and select from a plurality of different applications that may be installed and executed by the gateway device and/or the management server (and possibly by devices associated with the convenience store). There are many different types of applications that are possible and may be desired by a manager or other user of the convenience store. While the following descriptions provide some examples of such applications, these are in no means limiting, and further applications are envisioned.

In one embodiment, the management server and the gateway device may be initially configured with a framework or default configuration, before a manager or other user installs such applications. For example, the gateway device may be initially configured to report information gathered by any devices with which it can communicate. The management server, in turn, may be configured to provide such information to one or more users, as described above. The framework may also allow for easy installation of applications in response to user selection of applications to install.

In one embodiment, the gateway device may not be aware of, or may not be able to manage, various ones of the premise devices of the convenience store. A user may accordingly install one or more applications in order to allow the gateway device to manage the convenience store devices. For example, the user may choose to install an application specific to the type of fuel tank device (or sensor) that is present at the convenience store. Accordingly, the server may provide at least a portion of the application to the gateway device. The gateway device may then install and execute the provided application on the gateway device, and the installed application may allow the gateway device to manage the fuel tank device (e.g., receive reported information from the fuel tank device and/or control the fuel tank device, as desired). In alternate embodiments, rather than a user specifying installation of the application, the server may automatically install the application without requiring user input selecting the application. For example, the gateway device may detect the presence of the fuel tank device and provide identification information to the server. The server may then automatically provide a corresponding application to allow the gateway device to communicate with the fuel tank device.

In some embodiments, a portion of the application may be installed on the management server. For example, the application may include a first portion (provided to the gateway device) to adequately perform management of the fuel tank device, and the application may include a second portion for user interaction. For example, the second portion of the application may be executed by the server to provide the received reported information to various other devices for presentation, provide a user interface (e.g., a graphical user interface or "GUI") to control or modify settings associated with the fuel tank device, provide a user interface to set up fuel level thresholds (for when the fuel tank should be refilled), set up contact information associated with the fuel tank (e.g., whom to contact when the fuel level is below a threshold), purchase order information for requisitioning more fuel when the fuel tank is depleted, etc. The second portion may be a pluggable module into a management application (e.g., within a website) provided by the server. In one embodiment, the management server may include a database of available interfaces (e.g., associated with each application that is configured for execution on the management server) and, in response to an application being installed, associate the interface (or application portion) with the gateway device or user for which the application was installed. Thus, the application portion may already be present on the management server and may simply be activated upon installation (e.g., by associating a user or location with the application in a database). Thus, the second portion may "add on" to a management interface for the convenience store provided by the server.

As indicated above, another portion (e.g., a third portion) of the application may also execute on other devices. For example, various users associated with the convenience store may use various types of devices (e.g., devices associated with users or "user devices") to monitor or control premise devices of the convenience store. For example, the devices may include various computer systems or devices, such as a desktop computer, a laptop computer, a tablet computer, a netbook, a personal digital assistant (PDA), mobile phone, etc. The third portion of the application may be installed on one or more of these devices to allow respective users to manage the devices of the convenience store. In some embodiments, the third portion of the application may be a stand alone application for the devices.

Alternatively, the portion of the application may be a modular portion that may "plug in" or operate within a larger program, e.g., for monitoring the convenience store, or a plurality of stores or locations, as desired. Thus, following the fuel tank device application above, a stand alone fuel tank device application may be installed on a user's device for the user to monitor or control the fuel tank device. Alternatively, the user may have an application for managing the convenience store and the fuel tank device application may be installed as a modular addition to that program, in addition to other modular additions for other devices or functions associated with the store. Note that this embodiment may be extended to devices that are not associated with users, as desired.

Similarly, applications specific to various POS devices, liquid dispensing machines, refrigeration devices, or any devices of the convenience store may be installed on the gateway device, the server, and/or other devices. These applications may be preferably developed by the manufacturers of the respective convenience store devices (e.g., where interaction with the devices uses a proprietary protocol); however, in alternate embodiments, the applications may be generated by any party (e.g., $3^{rd}$ party developers). In one embodiment, developers may use an API and/or SDK in order to develop the applications stored on the application server. The API or SDK may be an open API or SDK or may only be provided to authorized users or companies.

Additionally, while the above described applications are specific to individual types (or even models) of premise devices in the convenience store, there may be applications that are not device specific. For example, a web hosting application may be deployed on the gateway device that allows the gateway device to become a web server, e.g., for providing a web site of the convenience store. In one embodiment, there may be an administrative application that relates to handling employee schedules and proper notification rules for various alarms or devices, e.g., allowing implementation of various embodiments described above. Additionally, there may be an application that provides a specific type of interface for viewing the reported information of the various devices of the convenience store, alerts of the convenience store, use of resources of the convenience store, etc. For example, an application may provide a graph indicating fuel consumption across all of the fuel tanks of the convenience store. Another application may monitor or keep track of transactions performed by the POS devices of the convenience store, e.g., to provide bookkeeping functionality, to analyze transactions (e.g., to determine trends of the data, such as peak business or profitability over various time periods), to visualize the transaction data, etc. Further applications are envisioned.

Thus, FIG. 1A illustrates an exemplary system where the gateway device manages devices at a convenience store.

FIG. 1B illustrates an alternative system where the gateway device manages premise devices at a user's home. In this example, the gateway device may provide an interface for and/or manage the user's solar panel(s), fish tank, audio/video equipment (such as a TV, DVR, receiver, DVD player), refrigerator, and/or personal devices (e.g., computers, cell phones, tablet computers, home theatre computers, etc.). Further types of premise devices may be managed by the gateway device, such as lights of the home, the garage door (or other devices associated with the garage), oven(s) (such as microwave, gas, and/or electric), heating and/or cooling systems, attic fans, fireplace(s), pool systems, security systems, gaming consoles, modems, routers, web servers (or other software executing on various systems), phone systems, answering machines, videoconferencing systems, health monitoring devices (such as a pacemaker), smoke detectors, carbon monoxide detectors, washing machines, drying machines, etc.

FIG. 1B may operate similar to FIG. 1A except that the gateway device is placed in a home and controls premise devices of the home. Additionally, in the embodiment of FIG. 1B, the separate management server and application server of FIG. 1A have been combined as a "cloud server". Note that these two servers may still be physically separate, or may be implemented by the same one or more servers with separate software functionality, as desired. Thus, the cloud server may be implemented as two separate sets of servers (one for management and one for applications) or may be implemented together, among other possibilities.

In the embodiment of FIG. 1B, a head of family (or any subset of the family members, among other possible authorized users) may be the party that is notified for most reported or alert information. In further embodiments, the gateway device or the server may notify various third parties for different alerts or reported information. For example, in the event that a communication line ceases functioning (e.g., an Internet connection, phone line, etc.), a utility company may be automatically notified in order to troubleshoot the problem. In another embodiment, the electric company may receive reported information of the amount of power the solar panels have provided back into the electricity grid. Further, the solar panel manufacturer (or a company associated with the solar panels) may be notified if they cease to function properly. Further, police may be notified when a security breach is detected, firefighters when a fire is detected, paramedics for a health emergency, etc.

Additionally, individual family members may be associated with particular premise devices. For example, if the fish tank is located in a child's room (or is taken care of by the child), the child may be notified when the fish need to be fed, if the tank temperature is too high or too low, if a dead fish has been identified, etc.). Similarly, reported information associated with a game console may be provided to the resident gamer of the household rather than all of the family members.

Thus, FIG. 1B illustrates an exemplary home which includes a gateway device that manages various premise devices of the home. The gateway device may be deployed in a variety of other systems or locations. Essentially, the gateway device may be deployed in any environment for managing one or more devices. For example, the gateway device may be a merchant gateway device that is deployed at a specific merchant location of a merchant. The merchant may be a restaurant (e.g., fast food, family dining, etc.), department store, clothing store, retail store, or any type of store, as desired. The gateway device may also be appropriate at various companies (e.g., for branch offices or main offices, as desired).

In further embodiments, the monitoring may be extended to delivery trucks (e.g., for the delivery truck itself or for the store(s) which receives the delivery). As an example, a food delivery truck may include a gateway device that reports on the status of the various food items in the delivery truck (e.g., the temperature inside, whether it has exceeded a threshold temperature, etc.). The store receiving the goods (or the truck's company itself) may monitor the condition of the food/truck, e.g., to ensure food safety measures are properly followed. Thus, the gateway device may be used in a variety of different locations or systems.

FIG. 2—Block Diagram of Exemplary System

FIG. 2 illustrates a block diagram of one embodiment of an exemplary system. As shown, the gateway device may be coupled to various local or premise devices, e.g., of a convenience store, merchant location, or other location. As shown, the gateway device may include a router for providing a local area network at the location (e.g., for the local devices). The gateway device may also include a firewall between the Internet and the local area network.

In the embodiment, of FIG. 2, the gateway device may have a separable (or simply, separate) display, which the gateway device may communicate with in a wired or wireless fashion (e.g., over the local area network), as desired. For example, the gateway device may be stored in a server closet or room, in which case, a display collocated with the gateway device may have limited use for employees wishing to interact with the gateway device or view reported information. Accordingly, the display may be separated from the gateway device and placed in a more convenient location, e.g., where one or more employees can view reported information of the various local devices and/or control the devices (e.g., by using input device(s) that may also be separated from the gateway device). In alternate embodiments, similar to discussions above, other users may simply use other devices to monitor and control the devices, and a separable display may not be necessary or desired. Thus, the gateway device may be a "headless" or display free device. The gateway device may be coupled to the Internet as well as local devices at the merchant location.

In some embodiments, such as shown in the embodiment shown in FIG. 2, the gateway device may have a more direct connection to the server than through the Internet. For example, the gateway device may be coupled to the server via a private network or alternate WAN, e.g., that may provide more security than over the Internet. Alternatively, or additionally, the connection to the server may be via a virtual private network (VPN). Regardless of the type or method of connection, the gateway device may be configured to provide reported information to the server, which may store the information (and/or derived information) in the cloud based storage that is coupled to the server. Additionally, one or more clients may be coupled to the Internet and may receive various reported information or notifications from the gateway device and/or the server. Further, as indicated above, the server and/or clients may control various devices via the gateway device. Note that the clients may perform this control by communicating with the server or by directly communicating with the gateway device, as desired.

Figure 3:
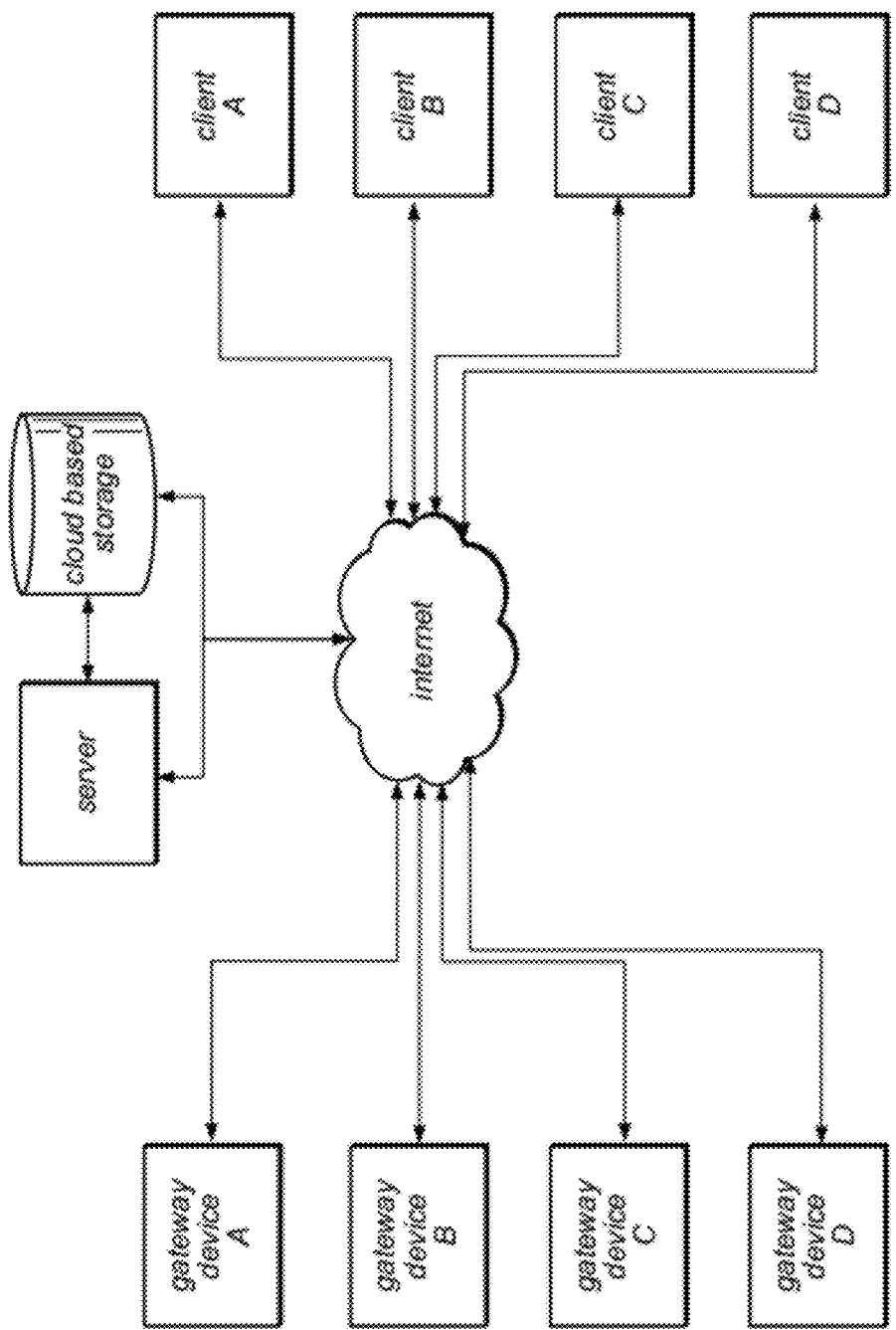

FIG. 3—Exemplary System with Multiple Gateway Devices and Clients

FIG. 3 illustrates a block diagram of an exemplary system including a plurality of gateway devices and clients, according to one embodiment. As shown, each of the gateway devices A-D, each of the clients A-D, the server, and the storage are coupled to the Internet. The cloud server, gateway devices, and clients may all generally operate according to embodiments described above. As noted above, the server may be a cloud server and the storage may be cloud-based storage.

In some embodiments, each of the gateway devices may be associated with a common company (e.g., merchant) or user. For example, gateway device A may correspond to a first convenience store of a convenience store chain, gateway device B may correspond to a second convenience store of the convenience store chain, gateway device C may correspond to a third convenience store of the convenience store chain, and gateway device D may correspond to a fourth convenience store of the convenience store chain. Following this particular example, each of the clients may be associated with individual ones of the convenience stores, premise devices within individual convenience store(s), with the convenience store chain, etc., as desired.

For example, client A may correspond to a device used by an owner of the convenience store chain. Accordingly, the owner of the chain may receive reported information from and be able to control any of the devices at the various convenience stores. For example, the owner may be able to view data or control devices of the first convenience store, the second convenience store, the third convenience store, and/or the fourth convenience store, e.g., since they are all associated with the same convenience store chain. Thus, client A may have access to a view (e.g., within a browser or dedicated application) of any or all of the stores within the chain.

Client B, on the other hand, may correspond to a manager of the first convenience store. Accordingly, the manager may only be able to (or care to) view data associated with or control devices managed by the gateway device A. Thus, client B may have access to a view of only the first convenience store (e.g., allowing client B to view any or all of the premise devices or associated data of the first convenience store), but may be restricted from viewing any data for other convenience stores.

As another possibility, client C may be a user associated with only a particular device (or set of devices) from a particular store. For example, client C may correspond to a diesel fuel company that delivers diesel fuel to the first convenience store when the diesel fuel (e.g., of individual fuel tanks or overall) at the first convenience store is below a certain level. Thus, client C may only have a view corresponding to premise devices that are associated with that user (e.g., the job of that user).

Client D may correspond to a financial analyst employee of the convenience store chain. Accordingly, the financial analyst may only receive reports of the sales for each of the different convenience stores, but may not receive other information that is not relevant to financials (e.g., the temperature of the refrigerators in the various stores). For example, the financial analyst may receive sales data for each of the POS devices at the different stores, current gas prices, etc., but may not receive information unrelated to financial data of the convenience stores. Thus, client D may have a view for this restricted set of data for each store and/or all of the stores (e.g., within a same view).

Thus, in one embodiment, a plurality of gateway devices may be associated with a same entity (e.g., a merchant) and various clients may access data of that entity. In another embodiment, the different gateway devices may not be associated with one another or a common entity. For example, gateway device A may correspond to a user's home, and client A may correspond to the person owning the home. Gateway device B may correspond to a convenience store and client B may correspond to an employee of the convenience store. Gateway device C may correspond to a department store, and client C may correspond to a manager of the department store. Gateway device D may correspond to an exhibition hall, and client D may correspond to a scheduler or manager of the exhibition hall. In these examples, each of the clients may not be aware of the gateway devices other than the one that is associated with them. Thus, the cloud server may manage a plurality of distinct clients and gateway devices that are not interrelated.

In further embodiments, clients A and B may each be associated with gateway devices A and B and clients B and C may each be associated with gateway devices C and D. Any subset of clients may be associated with any subset of gateway devices, as desired. Thus, the server may be configured to maintain any desired relationship between a plurality of gateway devices and clients.

Figure 4A:
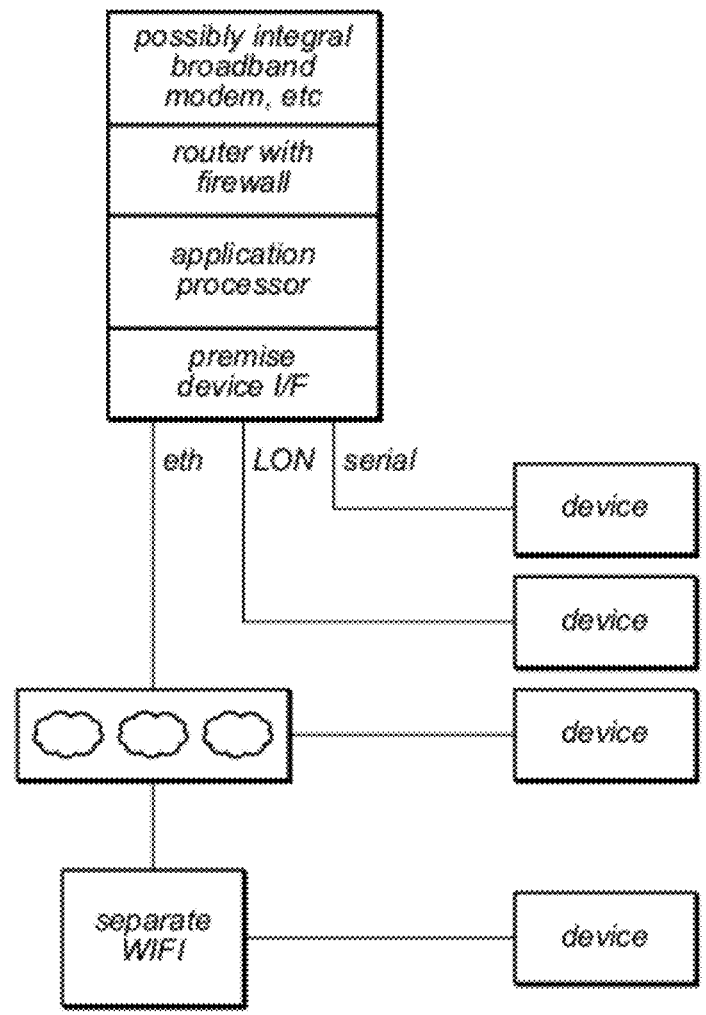
FIGS. 4A and 4B are block diagrams of a management device, according to one embodiment.
Figure 4B:
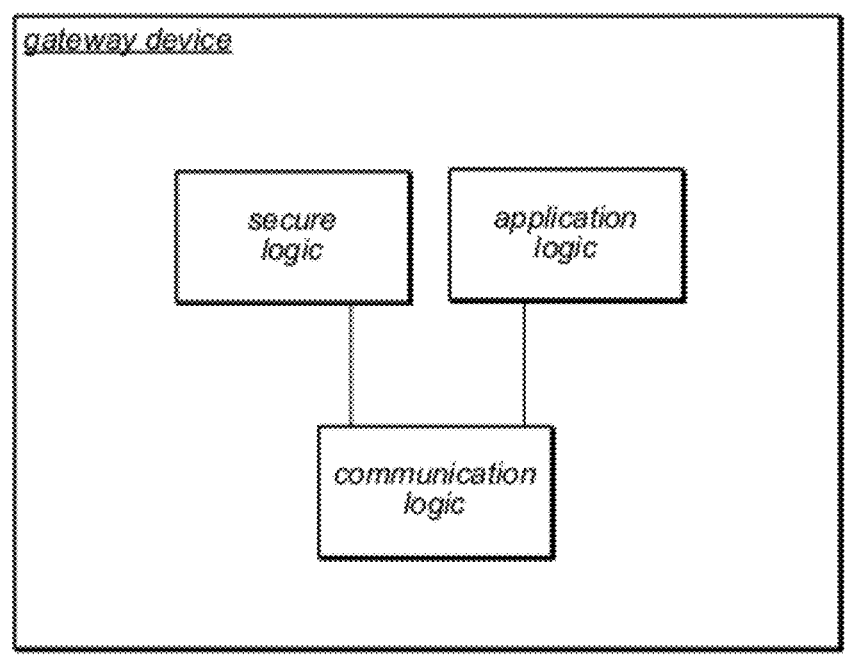

FIGS. 4A and 4B—Exemplary Block Diagram of Gateway Device

FIGS. 4A and 4B illustrate exemplary block diagrams of the gateway device, according to various embodiments. As shown in FIG. 4A, the gateway device may include an integrated broadband modem or other circuitry for establishing a connection to the Internet or another network (e.g., a DSL modem, cable modem, and/or fiber modem, among other possibilities). The gateway device may also include a router for providing a local area network (e.g., a wired and/or wireless LAN) to various devices. Alternatively, the gateway device may be connected to a modem and/or router, e.g., when these are not integrated into the gateway device.

The gateway device may also provide a firewall between the external connection (e.g., the Internet) and the resident portion of applications. Additionally, the gateway device may provide a firewall between the resident portion of applications and other applications, or connected devices. The firewall may be specially adapted to protect credit card information that is transmitted via the gateway device (e.g., from POS devices coupled to the gateway device).

The gateway device may further include logic for performing the functionality described herein. For example, the gateway device may include one or more field programmable gate arrays (FPGAs), integrated circuits (e.g., ASICs), and processors and memory to perform the functionality. In some embodiments, the processor and memory may be used to store and execute applications provided by the server.

Finally, the gateway device may include a device interface for coupling to various devices, e.g., managed by the gateway device. For example, the interface may include various wired connections for coupling with the premise devices (e.g., USB, Rs232, Rs485, etc., LONtalk, Ethernet ports, etc.). The interface may also couple to one or more switches, hubs, external routers, or external networks (wireless or wired, as desired) to couple to (and potentially mange) further devices. For example, as shown, the interface may include an Ethernet connection to a device (e.g., a switch) that connects to both a WiFi network and another device. The interface may also include video ports for coupling to a display for the gateway device, although a display may not be necessary.

FIG. 4B illustrates a different block diagram of the gateway device. In the embodiment of FIG. 4B, the gateway device may include communication logic and applications logic, and possibly secure applications logic. The communication logic may include any processors and memories and/or circuitry for communicating with the Internet, communicating with the premise devices at the location, providing routing functionality, providing modem functionality, etc. For example, the communication logic may include routing logic, wireless communication logic, wired communication logic, broadband modem logic, firewall logic, etc. In some embodiments, the communication logic may include a processor and memory, and the memory may store program instructions that are executable to perform the routing functionality or other communication functionality.

The application logic may include a processor and memory, and the memory may store applications (e.g., provided by the applications server) that may be executed by the processor. The application logic may include other circuitry, as desired.

The gateway device may also include secure logic, which may be configured to store and handle any information that requires security, such as isolation from the application logic where other applications are executed. For example, the secure logic may include a different processor and memory than the applications logic, and the memory may store applications that handle information (e.g., credit card information) in a secure manner.

In some embodiments, the secure logic may use a dedicated portion of the communication logic for receiving the secure information. For example, the gateway device may have a dedicated port (or wireless network) for receiving credit card information, which is isolated from the rest of the communication circuitry (e.g., the communication logic may have two isolated portions, one for the secure logic and one for the application logic or other functionality of the gateway device). Accordingly, the credit card information may be provided to the secure logic without any applications of the application logic being able to access the credit card information. This separation of the secure logic may allow the gateway device to be certified to perform credit card transactions.

In some embodiments, one or more of the logics of FIG. 4B may be separate integrated circuits or devices that are comprised in the same housing (of the gateway device). Thus, in one embodiment, the secure logic may be a separate integrated circuit within the gateway device, e.g., to ensure isolation from the other applications executing on the gateway device. Alternatively, the applications logic and the secure logic may be implemented by the same circuitry and the secure logic may be separated from the application logic via software. In further embodiments, one or more of the logics may be separated into different housings (e.g., the secure logic may be a separate device from the gateway device).

Thus, FIGS. 4A and 4B illustrates an exemplary block diagram of the gateway device. Note however that other variations and embodiments are envisioned. For example, in further embodiments, the gateway device may perform further functionality, such as providing a femtocell for local cell phones, providing DVR or audio/visual functionality for a user (e.g., in a user's all-in-one device), providing a security system, controlling HVAC at the location, etc.

Figure 5:
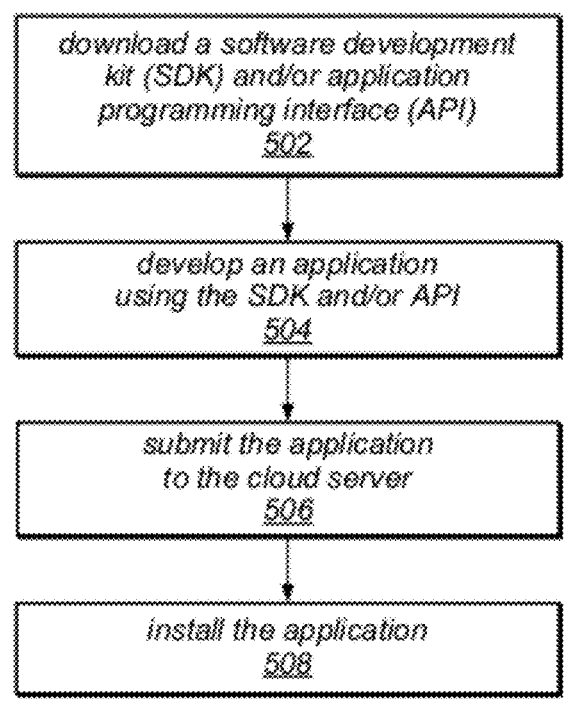
FIG. 5 is a flowchart diagram illustrating an embodiment of a method for developing an application for a gateway device.

FIG. 5—Developing an Application for a Gateway Device

FIG. 5 is a flowchart diagram illustrating one embodiment of a method for developing an application for a gateway device. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 502, a software development kit (SDK) and/or application programming interface (API) may be downloaded, and, in 504, the SDK and/or API may be used to develop an application. For example, a user or developer that wishes to develop an application for installation on a gateway device (and/or the management server or other devices) may download the SDK and/or the API in order to develop the application. In one embodiment, the developer may need to register with the server (or entity managing the server) in order to receive the SDK or API. For example, the developer may need to pay a licensing or developer's fee, sign a non disclosure agreement, sign a terms of user policy, etc. in order to receive the SDK or API.

The SDK and/or API may allow the developer to develop an application that is compatible with the gateway device, the management server, and/or other devices that may execute portions of the application. In one embodiment, the SDK or API may be downloaded as executable program instructions (e.g., when downloaded as a development environment) and/or as documentation. For example, the SDK may include a compiler and/or simulator for compiling and testing the application, e.g., as it is developed. For example, the simulator may allow the developer to test execution on a simulated gateway device, simulated management server, simulated other device, or any combination (e.g., in order to test distributed execution of the application).

Additionally, the SDK may include demo or template applications (or they may be downloaded separately) that a user may modify to create further applications or may simply study for education purposes.

In 506, after the application has been developed, the application may be submitted to an application server (or "server"). For example, the developer may upload the application (e.g., in a compiled form and/or in source code form) to the application server. An approval process may be required before the application is available for installation on gateway devices, the management server, other devices, etc. For example, an administrator of the application server (or other authorized user) may review the source code, test execution of the application, etc. in order to ensure that the application behaves as it is intended and/or will not cause any issues for users installing the application (e.g., on gateway devices, the management server, or other devices). The testing may occur on each corresponding device that the application is intended to execute on.

This review may be particularly important since many of the gateway devices may handle sensitive information, such as credit card information. Accordingly, it may be important to ensure that the submitted application does not present any security issues for such sensitive information. However, in some embodiments, each application (or specifically, each third party application) may be "sand boxed" or otherwise secured such that the application is not able to interact with other data or information of the gateway device, management server, etc. Alternatively, any sensitive applications or information may be sand boxed away or firewalled from other applications (e.g., third party applications) to ensure the security of the sensitive information.

In 508, the application may be installed on one or more gateway devices. As described further below, users may browse the applications stored on the application server and select ones for installation on the gateway device (or other devices). Alternatively, applications on the application server may be automatically determined as described herein. 508 may be performed in the manner described below.

Figure 6:
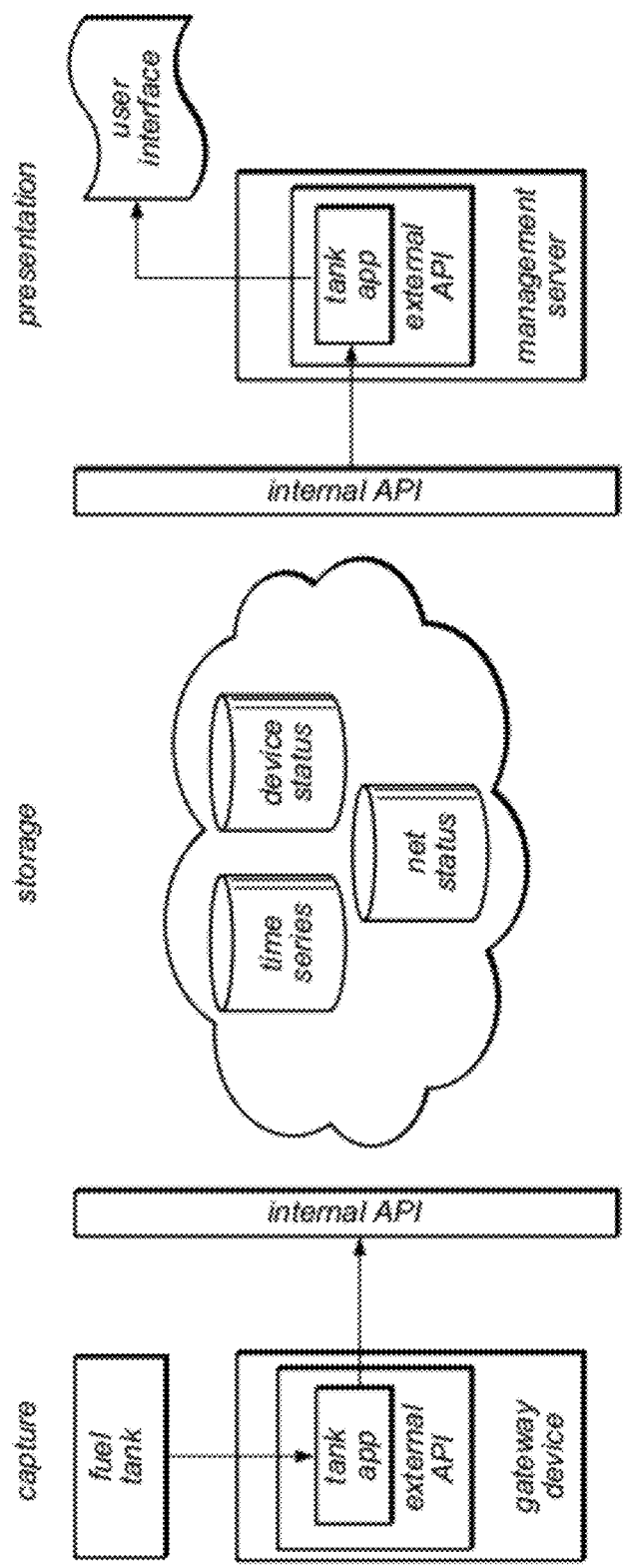
FIG. 6 is an exemplary diagram illustrating an embodiment of use of an application programming interface for an application.

FIG. 6 illustrates an exemplary use of APIs for a developed application. In the illustration of FIG. 6, the application is a tank application that is configured to determine the fuel level in the fuel tank and present the fuel level information in a user interface. In the embodiment of FIG. 6, the tank application is executed in a distributed fashion, by both the gateway device (on the capture side) and the management server (on the presentation side).

As shown, the tank application, executing on the gateway device, may receive information from the fuel tank using a communication protocol supported by the fuel tank device (e.g., the device monitoring the fuel level in the fuel tank). The tank application is also configured to provide the reported information for storage, e.g., in cloud storage on the Internet. In order to perform this functionality, the tank application interfaces with the gateway device using an external API, e.g., which may be provided in the SDK. For example, the tank application may use a set of library functions to communicate and retrieve information from the fuel tank. Similarly, the tank application may use a set of library functions to provide the reported data for storage. Accordingly, the gateway device may be configured to receive the reported information from the tank application and provide that information for storage via an internal API. The internal API, unlike the external API, may not be exposed or known to developers. Instead, the internal API may be the set of functions that the gateway device uses to perform the storage actions requested by the tank application. Thus, the capture portion of the tank application may receive information from the fuel tank and provide information for storage using an external API. As shown, after provision to the cloud storage by the gateway device (e.g., using the internal API), time series data (e.g., representing the fuel levels of the fuel tank over time), device status, and net status information may be stored in the cloud storage, among other possibilities.

On the presentation side, a second portion of the tank application may execute on the management server. This portion of the tank application may use a presentation external API to request information stored in the cloud storage. In response, the management server may use an internal API to retrieve the desired information. The tank application may also use the external API to display the retrieved information in a user interface provided by the management server. For example, the tank application may use the external API to generate a graph to provide the time series data of the fuel tank within a user interface framework provided by the management server (e.g., on a web page hosted by the management server). Thus, FIG. 6 illustrates an exemplary embodiment of a distributed application using internal and external APIs. Note that the fuel tank application is exemplary only and further types of applications, configurations, uses of APIs, etc. are envisioned. Additionally, further APIs and application portions may be used to display information on other devices (e.g., devices of users associated with the gateway device or location).

Figure 7:
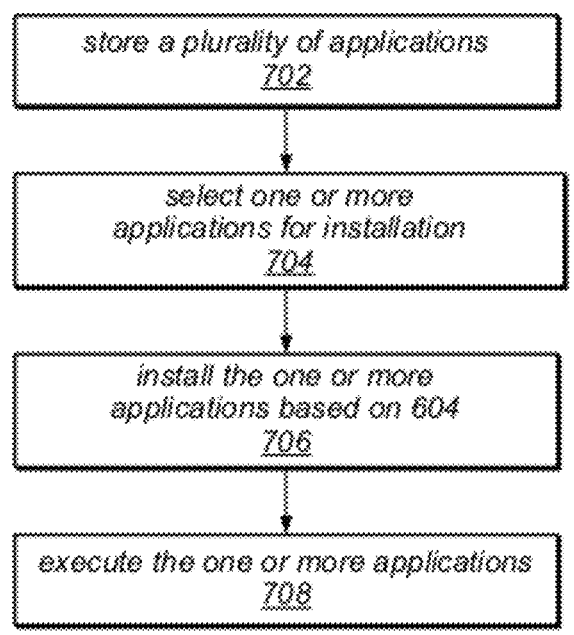
FIG. 7 is a flowchart diagram illustrating an embodiment of a method for storing and providing a plurality of applications to gateway devices.

FIG. 7—Storing and Providing a Plurality of Applications

FIG. 7 is a flowchart diagram illustrating one embodiment of a method for storing and providing a plurality of applications to gateway devices. The method shown in FIG. 7 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 702, a plurality of applications may be stored. The applications may be developed and/or received in the manner described above, with respect to FIG. 5, although other embodiments are envisioned. The plurality of applications may be hosted by a server (e.g., in cloud storage accessible by the cloud server).

In 704, one or more applications may be selected for installation. The one or more applications may be selected for installation manually or automatically as desired. For example, a user, such as an administrator of a location (e.g., a merchant location, such as a convenience store or a home, among other possibilities) or a plurality of locations (e.g., a chain of stores of a merchant), may wish to install an application from the plurality of available applications. Accordingly, the user may access the application server to browse or search the plurality of applications. For example, in one embodiment, the application server may host a web site and the user may log on to the web site to choose from the plurality of applications for installation. Alternatively, or additionally, the user may use a locally installed program that is in communication with the application server to select one of the applications for installation. For example, the locally installed program may retrieve the list of applications available from the application server and provide them for selection on a display of a client used by the user. In one embodiment, the user may access the application server (via webpage, application, or other mechanism) to visit a "store" of applications, which may be referred to as an application store, app store, PACKAGE WAREHOUSE™, PACKAGE STORE™, etc.

The user may be able to search for or browse through the different applications. Additionally, each application may provide a description (which may be textual and/or graphical, e.g., including screen shots) of the functionality and requirements of the application. After selecting the desired applications, the user may then specify the desired devices for installation (which may include the gateway device, the server, and/or other devices, such as user devices). Alternatively, or additionally, the user may specify a desired device and then select from applications that are available for that device. Other implementations for selection of applications and target devices are envisioned. For example, the server may be configured to automatically choose the target devices based on the selected applications, the corresponding user or entity, the corresponding location of the gateway device, the gateway device itself, etc. As one specific example, a user's device may already execute a management application to manage the gateway device(s) and corresponding coupled devices and the application portion that is intended for the user's device may be provided as an update to the management application (e.g., as a modular addition to the management application).

As indicated above, the applications may be any of a variety of applications. For example, a first one or more of the applications may be associated with particular devices that may be managed by a gateway device. These type of applications may be, for example, for communicating with or controlling POS devices, electronic sign devices, sensors, liquid dispensing devices, or any type of device that may be coupled to the gateway device. A second one or more applications may be associated with presentation or management of data received from the gateway device (e.g., for individual ones of the devices managed by the gateway device, for groups of the devices managed by the gateway device, or for any type of data associated with the gateway device's location). A third one or more applications may be associated with management of a plurality of different gateway devices, e.g., for aggregating or presenting the information gathered from a plurality of different locations. For example, applications of the third type may present financial data for all of the stores managed by a manager, fuel consumption of a plurality of different convenience stores, rate of device malfunction for liquid dispensing devices, etc. A fourth one or more applications may be associated with retrieving and managing the gateway devices (or devices managed by the gateway devices) on a user's device, such as on a mobile phone, desktop computer, laptop, netbook, tablet computer, etc.

Note that there may be applications that overlap with any of the above types of applications described herein. Additionally, various ones of the applications may be executed only by the gateway device, the server, or user's devices, and various others of the applications may be executed by more than one of the above. For example, a fuel tank monitoring application may be designed for execution by the gateway device (e.g., to receive reported information from one or more fuel tank devices and provide control messages to the one or more fuel tank devices), by the server (e.g., to receive the reported information from the gateway device, provide control messages to the gateway device for controlling the fuel tank devices, provide the reported information to client devices, and/or receive control information from client devices), and by user devices (e.g., to provide an interface for a user to view the reported information and control the fuel tank devices). However, in simpler distributed execution embodiments, an application may only be executed by the gateway device (e.g., for communication purposes) and by the server (e.g., for providing an interface to users) or simply just by the gateway device or server, as desired. The execution requirement or possibilities may be listed in the description of each application, for the user's consideration.

Thus, the user may browse through these different applications and select them for installation on the appropriate systems. Following the exemplary system of FIG. 1A, the user may select a fuel tank device application for the fuel tanks, a liquid dispensing device application for the liquid dispensing device, a refrigeration device application for the refrigeration device, a POS device application for the POS device(s), etc. Following the exemplary system of FIG. 1B, the user may select a TV application for the TV, a refrigerator application for the refrigerator, a fish tank application for the fish tank, a solar panel application for the solar panel(s), etc.

The user may also select other applications for installation that are not specifically associated with the devices managed by the gateway device. For example, the user may select an application for installation on one or more devices that are associated with user(s) associated with the location (e.g., employees, managers, owners, etc.) which allow for monitoring and/or control of the devices at the location. The user may also select an application for managing notifications of the various devices, although such features may already be present in the individual applications themselves. The user may also select an application for aggregating data from a plurality of different locations and/or gateway devices.

The user (or in embodiments below, the method) may be able to specify installation for a plurality of locations or devices. For example, an owner of a convenience store chain may select an application and specify installation of the application on a plurality of gateway devices or other devices. The owner may also specify that the application be associated with a plurality of locations on the management server (e.g., allowing the application to be added to the user interface for a specified plurality of convenience stores in his chain). In one embodiment, the user may specify a default application configuration that may be used for installation on a plurality of different gateway devices (e.g., as described below). Thus, the user may be able to specify mass installation of one or more applications for a plurality of different locations or gateway devices.

Thus, in one embodiment, a user may select applications for installation by browsing or searching through a plurality of applications in a user interface (e.g., a GUI) and selecting the applications for installation. However, it should be noted that the applications may also be selected in an automatic fashion. Specific embodiments describing automatic installation of applications are provided below in describing FIGS. 8 and 9.

In some embodiments, payment may be required for installation of the applications, e.g., a one time purchase fee and/or a subscription fee, among other possibilities. Accordingly, financial information may be required (e.g., pre-stored or provided by the user) in order to install the applications. In one embodiment, the payment may be reduced for bulk purchases. For example, a user may receive a discounted price per application when installing multiple instances of the application (rather than paying the same higher price for each installation of the application). For example, the user may be able to enter a discount coupon or code in order to receive a negotiated price. In some embodiments, the user may use a user interface to request a negotiated price and may receive a negotiated price based on the request (e.g., in response to user review). For example, a user may specify an amount of a purchase (e.g., a number of applications for installation, a number of products, a number of contracts, etc.) and may request a negotiated price (e.g., by specifying a desired price or simply requesting a lower price). Accordingly, the seller (e.g., the application developer) may determine a negotiated price for the user's request. Accordingly, the negotiated price may be provided to the user and the user may make a purchase at the negotiated price. In another embodiment, the buyer and seller may negotiate over a different medium (e.g., telephone, email, etc.) and a price may be determined. The seller may establish a price for the user, and that price may be associated with the user on the cloud server. Alternatively, the seller may provide a discount or coupon code for the user to make the purchase. Thus, in some embodiments, prices may be negotiated (e.g., for bulk purchases/installations of application(s)).

In 706, the one or more applications may be installed based on the selection in 704. For example, the server may receive a request to install the selected applications, e.g., from a client of the user. The server may determine (e.g., automatically) the proper location for installation of each of the applications. In some embodiments, the location of the installation may be specified by the application itself, or may be specified by the user. For example, if the application is to be installed on the server, the server may install the selected application on the server (e.g., as part of an interface associated with the user) without requiring any specification of installation location. Similarly, if the application is to be installed on the gateway device, the server may provide the application to the gateway device for installation. However, where there are multiple gateway devices, the request from the user may specify the gateway devices for application installation. Additionally, if the application is also capable of being installed on user devices (e.g., mobile phones), the user request may specify those devices.

Note that where the application is distributed across a plurality of different devices, the server may provide the appropriate portions to each of the different devices for installation. For example, for an application that is executed by the server and the gateway device, the server may install its portion and provide the gateway device portion to the gateway device for installation. Thus, the selected applications may be installed at their proper locations.

In 708, the one or more applications may be executed by the corresponding systems to perform the functionality specified by the one or more applications. For example, the applications may execute in the manner describe above, with respect to FIG. 6.

Figure 8:
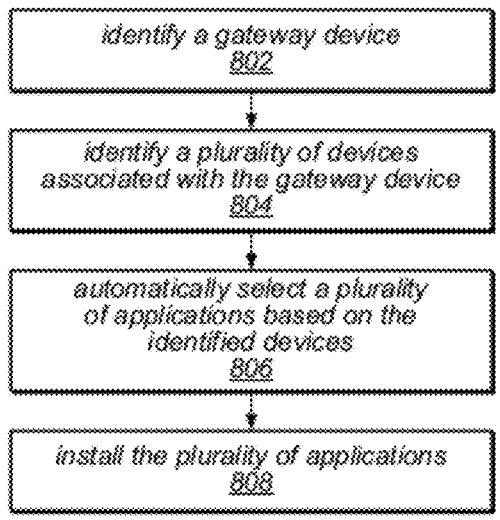
FIG. 8 is a flowchart diagram illustrating an embodiment of a method for automatically installing a plurality of applications on a gateway device based on detected devices.

FIG. 8—Automatically Installing a Plurality of Applications

FIG. 8 is a flowchart diagram illustrating one embodiment of a method for automatically installing a plurality of applications on a gateway device based on detected devices. The method shown in FIG. 8 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 802, a gateway device may be identified or detected. For example, in one embodiment, upon being installed at a location and having an operating network connection, the gateway device may automatically attempt to communicate with the server. The gateway device may provide message including a unique identifier identifying the gateway device to the server. Additionally, in some embodiments, the gateway device may report a location of the gateway device (e.g., using GPS circuitry or other methods for determining location). Similarly, the server may use various techniques for determining the location of the gateway device, as desired.

Alternatively, or additionally, a user may register the gateway device with the server. The user may optionally provide an IP address or other address to allow the server to communicate with the gateway device. Thus, in 802, the gateway device may be detected or otherwise identified to the server.

In 804, a plurality of devices associated with the gateway device may be identified. For example, the gateway device may be configured to automatically discover any premise devices on the same network as the gateway device. In various embodiments, the gateway device may actively seek out the other devices or the other devices may be configured to automatically notify the gateway device of their presence. In one embodiment, the gateway device may use various discovery protocols for performing the discovery, e.g., Bonjour, Plug-N-Play, ARP, or other protocols. Alternatively, or additionally, the gateway device may attempt to communicate with each IP address of the network at the location to determine if there is a device on the network at that IP address. For example, temperature sensors coupled to the refrigerator, a liquid dispensing device, a POS device, a fuel tank device, etc. may automatically be discovered by the gateway device. In automatic discovery, the devices are discovered without user input manually specifying the network address and the identification of the devices. During discovery, the type of the device, the model of the device, the serial number of the device, the location of the device, etc. may be determined.

In alternate embodiments, a user may assign or provide identification of some of the premise devices on the local area network. For example, in one embodiment, the gateway device may discover a premise device on the network, but may be unable to identify it. Accordingly, a user may provide input indicating the type of device, model of device, and/or other information used to identify the premise device. The user may also be able to specify undiscovered premise devices or premise devices that will be installed at the location at a later time.

In 806, a plurality of applications may be automatically selected based on the identified devices. For example, information specifying the plurality of identified premise devices (e.g., identification information) may be provided from the gateway device to the server. The identification information may include the type of the premise device, the model of the premise device, and/or a device identification number (e.g., the serial number of the premise device), among other types of identification information. In general, the identification information may be any information that is usable (e.g., by the server) to appropriately determine an application for managing the premise device. For example, the gateway device may determine that a premise device has a particular device identification number (e.g., by attempting to communicate with the premise device using different protocols, or via other means) and provide that device identification to the server. In one embodiment, the device identification number may be a numbering system used by the server and not specifically associated with the device (e.g., the server may have a database of device identification numbers, and these numbers may not be specifically associated with the device, as is a serial number). In another embodiment, the type of the device or manufacturer of the device may be identified from a generic identifier (e.g., using the Organizationally Unique Identifier" (OUI) portion of a MAC address). For example, the OUI may specify a manufacturer of a device. The server may then use the identification of the premise devices in order to automatically select a plurality of applications for installation. More specifically, in one embodiment, the server may use each identification information to select a corresponding application, if available.

For example, the identification information may specify a fuel tank device having a specific manufacturer (e.g., using the OUI) and/or model (e.g., using the serial number). The server may then determine if there are any applications associated with fuel tank devices that are compatible with the manufacturer and/or model of the fuel tank device (e.g., using a database). For example, there may be an application that supports all fuel tank devices made by the manufacturer or there may be an application for each model of the fuel tank device. Similar selection procedures may be performed for each of the different identified devices.

In 808, the plurality of applications may be automatically installed. The applications may be installed similar to 706 above. Note that at least a subset of the applications may be at least partially installed on the gateway device. In some embodiments, at least a portion of all of the applications may be installed on the gateway device. Similar to above, various ones of the devices may be designed for distributed execution among the gateway device, the server, and/or other devices, as desired.

Figure 9:
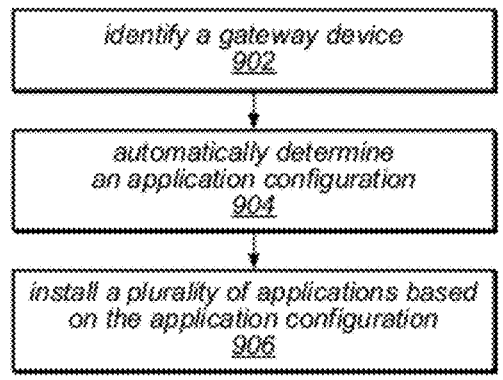
FIG. 9 is a flowchart diagram illustrating an embodiment of a method for automatically installing a plurality of applications based on an application configuration.

FIG. 9—Automatically Installing a Plurality of Applications

FIG. 9 is a flowchart diagram illustrating one embodiment of a method for automatically installing a plurality of applications on a gateway device based on a application configuration. The method shown in FIG. 9 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 902, a gateway device may be identified or detected, similar to 802 above. In some embodiments, the gateway device may be associated with a merchant or entity having a plurality of associated gateway devices. For example, the gateway device may be associated with a first convenience store of a convenience store chain that includes other convenience stores, each having one or more respective gateway devices. The association of the gateway device with the merchant or entity may be performed in response to user input (e.g., specifying that it is associated with the entity) or automatically, as desired. For example, the server may be configured to automatically identify that the gateway device is associated with the entity using the identification information provided by the gateway device, the location of the gateway device, the network that the gateway device is on (e.g., a network associated with the entity), the IP address of the gateway device, or via any other means that would associated the gateway device with the entity. However, in alternate embodiments, the gateway device may not be associated with a merchant or entity having one or more other associated gateway devices.

In 904, an application configuration may be automatically determined for the gateway device. The application configuration may specify a plurality of applications for installation for operation with the gateway device. Similar to above, the applications may be installed on the gateway device and/or the server.

In one embodiment, a default application configuration may be determined for the gateway device. For example, the default program configuration may include a management application that may be installed and executed by the gateway device and/or the server to allow users to interact with the gateway device. However, such functionality may already be installed and may not be included in a default program configuration provided after installation of the gateway device at the gateway device location. Other applications may be included in the default application configuration.

In some embodiments, the default application configuration may be associated with a type of location, e.g., but may be agnostic with respect to the specific merchant or entity associated with the gateway device. For example, there may be a default application configuration for convenience stores, for department stores, for homes, etc. Accordingly, depending on the type of location of the gateway device, a different default application configuration may be used.

Additionally, or alternatively, the application configuration may be based on the entity with which the gateway device is associated (assuming that it is associated with such an entity). In some embodiments, the default application configuration may be specific to the merchant or entity associated with the gateway device. For example, a convenience store chain may have a default application configuration for each gateway device installed in each convenience store of the chain. Alternatively, or additionally, the application configuration may be based on the plurality of applications installed on other gateway devices that are also associated with the entity, e.g., where each location generally includes the same types of devices and/or management prefers the same types of management or presentation applications for each location. In one embodiment, an administrator or other authorized user of the entity may specify the application configuration to be used for each new gateway device associated with the entity (e.g., thereby specifying a default application configuration). However, as indicated above, the application configuration may also be generated automatically by the server (e.g., based on gateway devices in similar locations or having similar attached devices) without receiving such input.

Thus, an application configuration may be determined, e.g., automatically, for the detected gateway device.

In 906, the plurality of applications may be automatically installed. The applications may be installed similar to 706 above. Note that at least a subset of the applications may be at least partially installed on the gateway device. In some embodiments, at least a portion of all of the applications may be installed on the gateway device.

Figure 10:
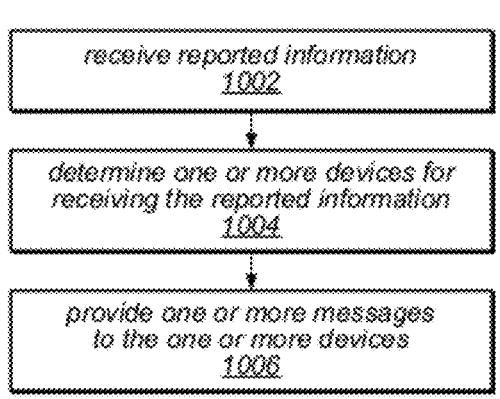
FIG. 10 is a flowchart diagram illustrating an embodiment of a method for notifying users of reported information of managed devices.

FIG. 10—Notification of Users

FIG. 10 is a flowchart diagram illustrating one embodiment of a method for notifying users of reported information of managed devices. The method shown in FIG. 10 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1002, reported information may be received, e.g., by the server. For example, the reported information may be received from a first gateway device for a specific premise device managed by the first gateway device. The reported information may include information gathered by the specific premise device (e.g., concerning a condition of the premise device, a condition of the environment near the premise device, any measurements performed by the premise device, etc.). For example, where the premise device is a fuel tank device, the reported information may indicate the current fuel level of the corresponding fuel tank. Alternatively, or additionally, the reported information may indicate an alarm condition, e.g., following the example above, where the fuel level is below a threshold level of fuel. Note that instead of receiving the alarm condition, the server may be configured to analyze the reported information to determine if there is an alarm condition. Such functionality may be implemented as part of an application, e.g., for the specific premise device or otherwise.

In 1004, one or more devices may be determined for receiving the reported information. The determination may be performed manually (where a user specifies which other users receives the reported information) and/or automatically, as desired. In preferred embodiments, the one or more devices may be determined automatically. For example, the server may store a plurality of rules for providing reported information to users and/or devices (e.g., user devices). The set of rules may specify any of the conditions described herein.

In one embodiment, there may be a set of users that should be notified of any reported information (or more particularly, any reported information when there is an alarm condition). Such users may be managers or owners of the location (e.g., the convenience store) or users associated with the location (e.g., managers or owners of a chain of convenience stores, including the store having the specific device). Each user may have a set of devices associated with the user. For example, a manager may be associated with a particular cell phone, tablet computer, desktop computer, and/or other device. Accordingly, the rules may indicate that all or some subset of those devices should be notified based on the reported information. These rules may indicate a general preference (e.g., manager A should only receive reported information via email whereas manager B should receive reported information via email and via text message), may be specific to the priority of reported information (e.g., high priority alarms, such as a break in, should be sent to all devices associated with the manager, and/or low priority alarms should be sent to the default device), may be specific to the type of reported information or managed device (e.g., financial information should be sent via email whereas gas pricing information should be sent via text message), etc. The selection of the devices may be selected based on other conditions as well, e.g., including, but not limited to a current time, a schedule of the user (e.g., a work schedule, vacation schedule, etc.), a location of the user (or associated devices), the gateway device providing the reported information, etc. Note that these rules may be fully customizable for each different user, e.g., where user A can set all of the above rules (among other possibilities) for himself and user B can set the above rules in a different manner than user A for himself.

Although the above descriptions relate to devices that are associated with users, there may be particular devices (e.g., not associated with users) that should also be notified or provided reported information. For example, a computer operated at the location of the first gateway device may also be notified of reported information for the devices at that location, e.g., at all times.

Other users or devices may only be notified conditionally. For example, the users or devices may be notified based on the current time. In one embodiment, the rules may specify time periods to receive reported information (or conversely, time periods to not receive reported information, or both). Accordingly, 904 may be performed by comparing a current time against these specified time periods. As one specific example, employees may only be notified when they are on shift. Similarly, a night manager may only be notified at night and a day manager may only be notified during the day. In one embodiment, rather than always being notified, the computer at the location of the first gateway device may only be notified when the location is open (e.g., during business hours of a convenience store) or when other users or employees are present.

Further, some users or devices may only be notified for particular managed devices. For example, a financial manager may only receive information associated with financials of the location (e.g., POS device transactions, gas prices, etc.) and not reported information of all premise devices. As another example, a fuel company or employee in charge of fuel refills may only receive reported information for fuel tank devices (e.g., of a single location or of multiple different locations) and may not receive reported information of other managed devices. Further, manufacturers of the various premise devices may be only notified for their devices (e.g., regardless of the location). Thus, the manufacturers of equipment be able to keep track of use, condition, etc. of installed premise devices (e.g., for developing use statistics, monitoring whether the devices have been properly maintained, ensuring proper warranty use, performing maintenance, etc.

Thus, in one embodiment, rules may specify that a particular user should receive information for a plurality of devices, and 1004 may be performed by determining whether reported information is received for one of the plurality of devices and, if so, determining one or more devices associated with the user for delivery of the reported information. Alternatively, or additionally, the rules may simply specify a type of device that the user should receive information for and 1004 may be performed by determining whether the reported information is received from a device that falls within the specified type and, if so, determining one or more devices associated with the user for delivery of the reported information.

Additionally, not only may the reported information be provided to specific users or devices based on the rules described above, these users or devices may only receive the information under certain conditions (which may also be specified by rules). For example, the fuel level of the fuel tank may only be provided to the fuel tank employee when the fuel level is below a certain threshold, since the employee may not be interested when the tank does not need to be refilled. Other conditions may include the location of the user (or the device associated with the user, e.g., when the user is out of the country or on vacation), whether the reported information has already been sent to a threshold number of users (e.g., where a user is only to be contacted as a last resort), etc.

Note that the above features may be implemented as core functionality provided by the server and/or gateway device or may be integrated within applications that can be installed. For example, there may be an application to manage notifications (e.g., to manage the rules described above) of the various devices to users. This application may be integrated with or separate from an application that stores employee work schedules or shift information (e.g., where the rules are based on schedules or specified time periods of the user(s)). Alternatively, or additionally, the fuel tank application (as an example) may include notification features for notifying employees or other entities (e.g., fuel companies) based on reported information of the fuel tank devices. Other types of implementations and applications are envisioned.

In 1006, one or more messages may be provided to the one or more devices based on 1004. The messages may be provided based on rules as well. For example, the rules may specify provision of messages depending on the types of devices. For example, SMS messages may be sent to cell phones, emails may be sent to devices having email addresses, IP messages may be sent to devices having an IP address, etc. Alternatively, or additionally, the rules may specify the default or desired types of messages for each device (e.g., as specified by users).

It should be noted that in the method described above, the received reported information may be aggregated to include reported information of a plurality of devices. The method may be performed for the aggregated reported information and/or may be performed for each specific device's reported information, as desired. Thus, it may be determined where the whole of the reported information is sent or it may be determined where each individual device's reported information is sent on a per device basis.

Figure 11:
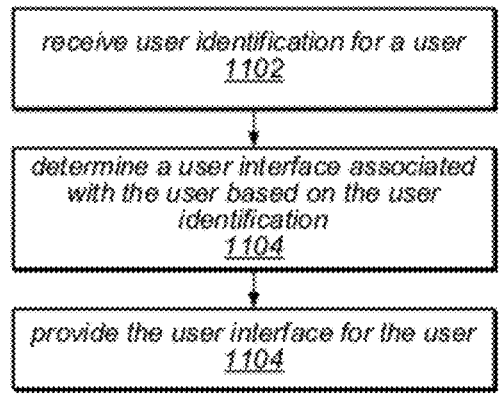
FIG. 11 is a flowchart diagram illustrating an embodiment of a method for providing a user interface to a user.

FIG. 11—Determining and Providing a User Interface for Display

FIG. 11 is a flowchart diagram illustrating one embodiment of a method for determining and providing advertising for display. The method shown in FIG. 11 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1102, a user may provide user identification, e.g., to the cloud server. For example, the user may provide the user identification (e.g., user name and password) to a web site hosted by the cloud server. Alternatively, the user identification may be provided through an application executing on a device (e.g., such as on a smart phone, tablet computer, netbook, computer, etc.).

In 1104, the cloud server may identify the user based on the user identification. Additionally, the cloud server (or the application) may determine a user interface associated with the user. For example, the cloud server may include a database of users and associated user interface information. Accordingly, the cloud server may use the user identification to determine the interface information associated with the user. The user interface information may indicate an interface layout and/or which applications are installed for the user.

For example, the database may indicate that the user interface of a manager of a convenience store includes all the interfaces of applications associated with the convenience store (e.g., that the interface should include all the installed applications). Thus, for example, when the manager of the convenience store logs in, the manager is able to view all of the reported information (or any information of the installed applications) within his associated user interface.

As another example, an owner of a convenience store chain may log in and the determined user interface may include interfaces for a plurality of convenience stores in the convenience store chain. In another example, a user associated with a refueling company may log in and the user interface may allow the user to view only the fuel tank information of convenience stores that use the refueling company for refueling their fuel tanks.

In one embodiment, the determination of the user interface may be associated with the entity that owns the corresponding location. For example, a fast food restaurant chain may have a user interface that is the same for all users associated with the fast food restaurant. For example, all restaurant managers may use the same interface for viewing reported information for their respective restaurant. In some embodiments, the user interface may also (or alternatively) be determined based on the type of user. For example, a manager may have a first interface while an employee may have a second interface, even when each user is associated with the same location or chain. Thus, similar to notifications described above, different users may have different interfaces depending on the type of the user, the types of devices associated with the user, the entity associated with the user, the security level of the user, etc.

In some embodiments, each user may be able to customize the user interface. For example, a user may be able to rearrange the location of various interfaces and, accordingly, the layout of the user interface may stored, e.g., in a database. Thus, each user may have a customized interface that is determined based on the user identification. Each user may also be able to install applications that are specific to the user. For example, each user may be able to install various social networking applications, games, desired user applications, etc., which may be outside of the purview of the location. Thus, the user interface determined for the user may include elements associated with the location(s) to which the user is associated (e.g., applications installed for a location, such as a convenience store) as well as elements that are associated with the user (e.g., separate applications or interfaces that the user has selected for that user's profile).

In one embodiment, the user interface may include various social networking applications or features, such as allowing the user to post status messages, interact with other users (e.g., that are also associated with the location, a chain or entity associated with the location, etc.). As described below, the user interface may include a ticketing system or forum that allows the user to post and/or respond to troubleshooting items (e.g., associated with the location), discuss various topics, etc.

Accordingly, in 1106, the determined user interface may be presented to the user, e.g., on the website.

Figure 12:
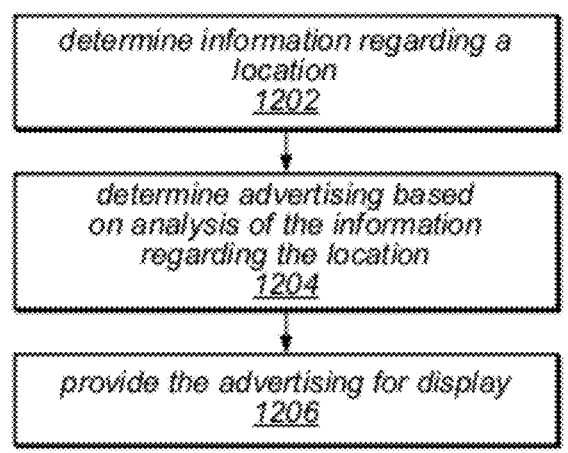
FIG. 12 is a flowchart diagram illustrating an embodiment of a method for providing advertising for display.

FIG. 12—Determining and Providing Advertising for Display

FIG. 12 is a flowchart diagram illustrating one embodiment of a method for determining and providing advertising for display. The method shown in FIG. 12 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1202, information regarding a location may be determined, and in 1204, that information may be used to determine advertising. In each section below, a respective type of information and corresponding uses for that information is described.

In one embodiment, the information may specify the devices (or types of devices) that are operated at the location. For example, the devices and/or types of devices may be determined by analyzing stored information regarding the location, such as information gathered via a gateway device installed at the location, similar to embodiments described above, or information provided by users, among other possibilities. For example, the information may specify that a convenience store includes or operates electronic signs, fuel tanks, liquid dispensing devices, cooling devices, etc.

This information may be used to determine advertising in a variety of manners. For example, in one embodiment, the method may determine other devices that may be desirable or compatible with the location based on the premise devices that are already present at the location. As one specific example, the location may include an ice machine that generates ice, but may not have an ice bagging device. Accordingly, the method may determine an advertisement that advertises an ice bagging device that is compatible with the ice machine. As another example, the location may include one or more cooling machines or freezers that store frozen food, and the method may determine that a microwave that could be used to thaw or reheat the food by customers may be desirable. Accordingly, an advertisement for a reheating device (such as a microwave) may be determined based on the cooling devices present at the location. In another instance, the location may include a home theater system, and the method may determine an advertisement for a DVR that may be compatible with the home theater system. Thus, the method may determine advertisements for other devices (e.g., compatible devices) to those already present at the location.

In further embodiments, the method may analyze the devices to determine what devices are not present that may be desirable (rather than determining other devices based on the devices already present, as in the examples above). For example, the method may store a list of premise devices that are commonly present in various types of locations (e.g., convenience stores, department stores, homes, etc.) and compare the list of current premise devices to that list to determine whether to advertise a device that is not present. For example, a convenience store may not have an electronic sign to advertise gas prices and the method may identify that the electronic sign is not present at the convenience store and determine an advertisement for an electronic sign. In one embodiment, the list of possible devices may be determined automatically. For example, the server may analyze other locations (e.g., of the same type, within the same area, associated by the same chain, etc.) and determine which premise devices are not present at the location being analyzed in relation to the other locations. Accordingly, in one embodiment, devices that are usually present in such locations, but are not present at the current stores may be suggested in an advertisement.

The method may also determine products or parts (e.g., replacement parts) associated with the determined premise devices. For example, the method may determine advertisements for coffee filters, coffee dispensers, coffee cups, etc. associated with a coffee device; fry baskets, frying oil, etc. for frying machines; light bulbs for lighting devices; chlorine tablets for swimming pools; saline or cleaning solutions for fish tanks; air filters for air conditioning units; coolant for cooling units; etc. Thus, advertisements for products or parts associated with the identified devices may be determined.

In some embodiments, the method may also determine advertisements for services that may be associated with the determined premise devices. For example, the method may determine advertisements for performing fuel delivery based on a fuel tank device; maintenance services for maintaining various devices, such as cooling devices, liquid dispensing devices, etc.; food delivery services for providing food items associated with devices (e.g., for delivering coffee for a coffee device); etc. Thus, the advertisements may include advertisements for services associated with premise devices at the location.

The information may also specify reported information of various premise devices operated at the location. For example, the information may specify a level of refrigerant for a cooling device, an amount of syrup for a liquid dispensing device, a level of ice in an ice device, a level of fuel for fuel tanks, etc. Accordingly, the method may determine advertisements based on the reported information of the device. For example, if the fuel tanks are low (e.g., less than a threshold), the method may determine fuel advertisements. Similarly, if the syrup in the fountain drink machine is low, the method may determine advertisements for fountain drink syrups. In another example, if the coolant of an air conditioning unit is low, the method may determine coolant advertisements or advertisements for a repair service to service the air conditioning unit.

Various other types of reported information may also be gathered, such as the condition of premise devices (e.g., indicating whether a premise device is operating poorly, is in bad condition, or operating sufficiently, etc.), age of the premise devices, etc. For example, if an air conditioning unit has not had its air filters replaced (or otherwise is indicates that air quality is suffering), the method may determine advertisements for air filters or a maintenance service. Alternatively, for lower priced items, if the condition of the device is sufficiently low, the advertisements may suggest replacement devices or upgrades to the devices. For example, when a microwave is no longer functioning properly, advertisements for new microwaves may be determined. Thus, advertisements may be generated based on the reported information of devices.

The information may also specify a type of location, which may be usable to determine advertisements. For example, the information may specify that the location is a convenience store and advertisements (e.g., for products or services) that are appropriate for convenience stores may be determined. For example, the method may determine advertisements related to pest services (e.g., insects or other pests), cleaning services (e.g., for the parking lot), trash services, fuel delivery services, bulk food services, etc. Similarly, for different locations, such as a home, the advertisements may suggest maid services (e.g., for cleaning the house), lawn services, grocery services, repair services, etc. that are appropriate for a home. In addition to services, products or other items may be suggested. For example, for a home, various electronic devices or appliances may be suggested; for a convenience store, various food items, vending machines, etc. may be suggested; for a department store, various apparel items that are appropriate for that type of department store may be suggested; etc. Thus according to some embodiments, advertisements may be determined based on the type of the location.

The information may also specify inventory levels, e.g., of a convenience store. In one embodiment, the server may receive information (e.g., or otherwise store information) regarding the inventory of various items for purchase or use at the convenience store. For example, an employee or other entity may use an inventory management application to keep track of inventory supplies of the convenience store, which may be stored or otherwise accessed by the server. Accordingly, advertisements may be presented for items based on the inventory level. For example, if certain inventory items are low, advertisements for those items may be determined. As another example, the inventory may be used to suggest other products or items that the location may wish to sell. More specifically, the method may determine that the store is not selling a particular type of soft drink and then provide advertisements to buy the soft drink for resale.

The information may also specify a geographic location of the location, demographic information of the location, socioeconomic information of the location, etc. For example, the method may use the geographic location, demographic information, and/or socioeconomic information to determine services or products that may be popular in that location, and then determine advertisements for those services or products. As one example, based on the geographic location of convenience store (e.g., in Texas) and demographic information (e.g., rural population and migrant workers), the method may determine a food product that is popular or typical, such as tex-mex food (e.g., burritos) and determine an advertisement for that food (e.g., for stocking the convenience store with the advertised food). The geographic location could also be used to identify weather patterns and provide advertisements based on those weather patterns (e.g., air conditioning units for warmer areas, heating units for cooler areas, hail resistant roofs for areas prone to hailing, snow shovels for areas that receive a lot of snow, etc.). Socioeconomic information could be used to determine advertisements as well. For example, where the location is a home of a relatively wealthy person, the advertisements may concern high end electronic devices such as laptops or smart phones.

The information may specify the applications installed with respect to the location (e.g., on the server, on the gateway device of the application, on devices associated with the location, etc.). Accordingly, advertisements for other applications (or different application installation locations) may be determined based on the list of advertisements. For example, the method may determine advertisements for applications which are compatible with the devices operated at the location, applications for managing data associated with the devices, etc. The advertisements regarding applications may be performed in a similar manner to the installation of applications described above in FIGS. 7-9.

Thus, any of various information regarding a location may be used to determine advertisements.

In 1206, the advertising may be provided for display. The advertising may be provided for display in any number of locations via any number of devices. For example, the determined advertising may be provided for display at one or more computer systems at the location, in interface(s) provided by the server (e.g., within web pages used to display reported information or alerts), in interface(s) used to interact with the devices or view reported information (e.g., user devices which execute an application for interacting with the devices or viewing the reported information), within the application store (or package warehouse, such as when the applications are being selected or purchased), within an application interface (e.g., for in-application purchases, whether they are on the website or on a user's device), etc.

In some embodiments, the advertisements may be provided to specific devices or users based on the type of the determined advertisements. For example, advertisements for larger purchases may only be provided to users (e.g., devices associated with users) with the ability to authorize or make such purchases, whereas advertisements for smaller purchases may be provided to all users. In some embodiments, the advertisements may be provided based on the role of the user. For example, a user associated with fuel systems may receive fuel related advertisements (or have a preference towards those advertisements), a user associated with finance may receive finance related advertisements, a user associated with a particular location may only receive location specific advertisements, a user associated with a chain of locations may receive advertisements that can apply to one or a plurality of locations (e.g., bulk purchase advertisements or chain wide advertisements), etc. Thus, the advertisements may be targeted to individual users based on the types of advertisements.

Additionally, the advertisements may be provided to specific interfaces based on the type of the determined advertisements. For example, advertisements related to applications may be provided within the applications store (or application selection interface). As another example, advertisements related to fuel may be provided when a user is viewing reported information related to fuel devices. Advertisements for maintenance or repair services may be provided for particular types of premise devices when reported information of the premise device is being viewed (e.g., and when then condition indicates that a repair or maintenance should be performed). Thus, the advertisements may be automatically determined and provided based on the context of the current interface.

After the advertisements are provided, a user may be able to purchase the advertised products. As indicated above, the advertised products may be physical products, service agreements, or software products (e.g., further applications that may be installed on gateway device(s), user device(s), other devices, the interface provided by the management server, etc.).

Thus, FIG. 12 illustrates various embodiments of providing advertisements based on information regarding a location, such as a merchant location, although others are envisioned.

FIGS. 13A-15C—Exemplary Screen Shots

FIGS. 13A-13L, 14A-14D, and 15A-15C illustrate exemplary screen shots corresponding to embodiments of the methods described above. Additional features shown in these Figures are applicable to embodiments described above, and the specific implementation shown is not limiting; instead, any variation or appropriate modifications for other applications are envisioned.

Figure 13A:
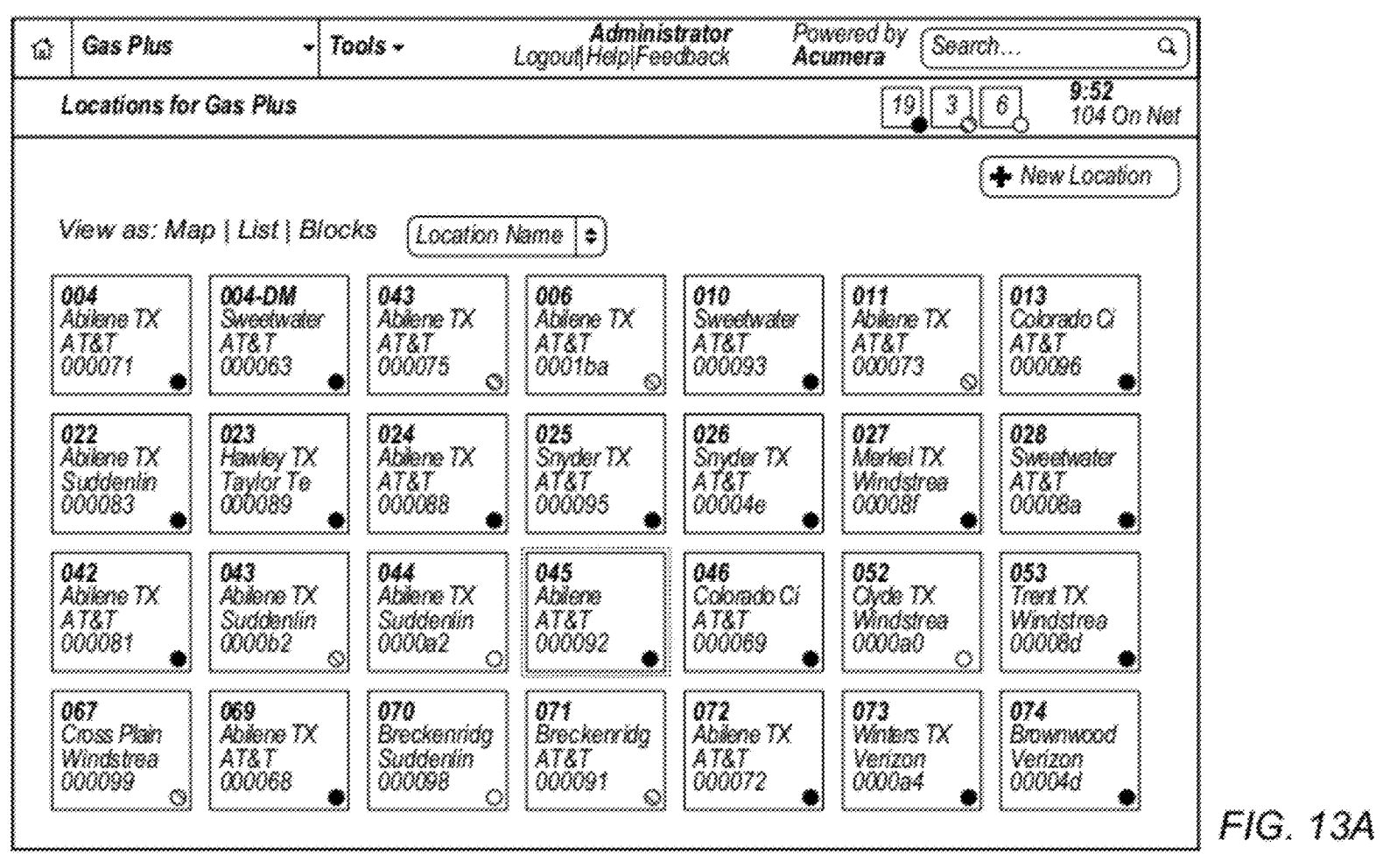

FIG. 13A illustrates an exemplary interface (e.g., a webpage) for monitoring a plurality of different convenience stores in a convenience store chain. As shown, the convenience store chain may be "Gas Plus". This interface illustrates a plurality of Alon Brands stores in or around Abilene, Tex. In some embodiments, each icon for each store may have a corresponding status, which may be illustrated using a color or in other methods. In FIG. 13A, the status of each store is illustrated using a condition marker (black circle for critical, hashed circle for warning, white circle for ok).

Figure 13C:
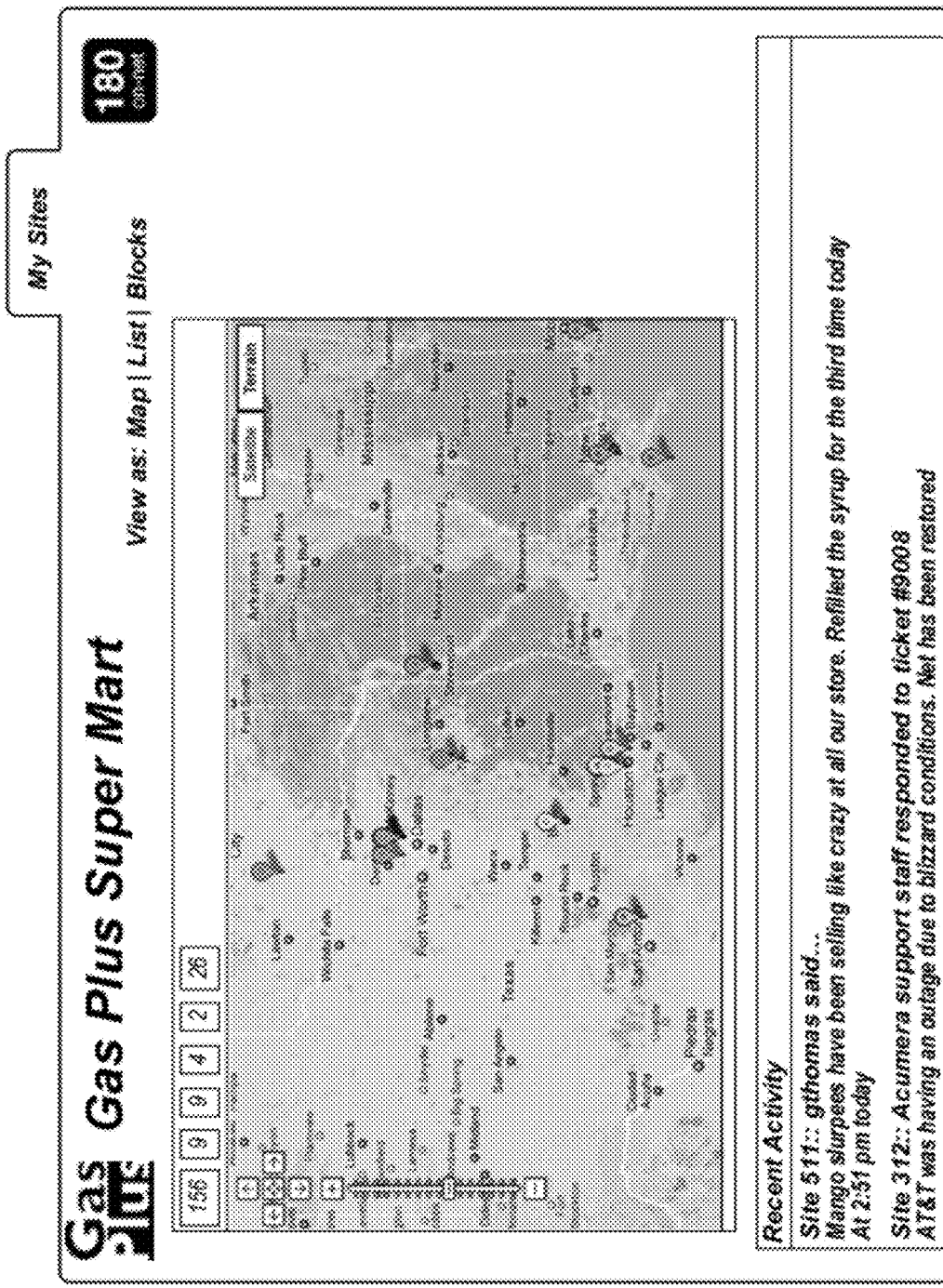
FIGS. 13A-15C are exemplary screen shots corresponding to the described methods, according to one embodiment.

As shown in the toolbar, the user (in this case, "administrator") may access various features, e.g., tools, help, feedback, logout, search functionality, etc.). The user may be able to add a new location by pressing the "+New Location" button or perform other tasks. The user may also be able to select one of the stores to view further information about that store. FIG. 13B illustrates an alternate view where the user may view the various different locations in a list view. As shown, each different store may have a status icon, location, carrier (e.g., for broadband connection), serial number (e.g., of the gateway device), etc. FIG. 13C illustrates a map view where the various locations can be displayed on a map. As also shown in the interface of FIG. 13C, recent activity of the displayed locations may be displayed, e.g., where users can post messages concerning the various locations.

Figure 13D:
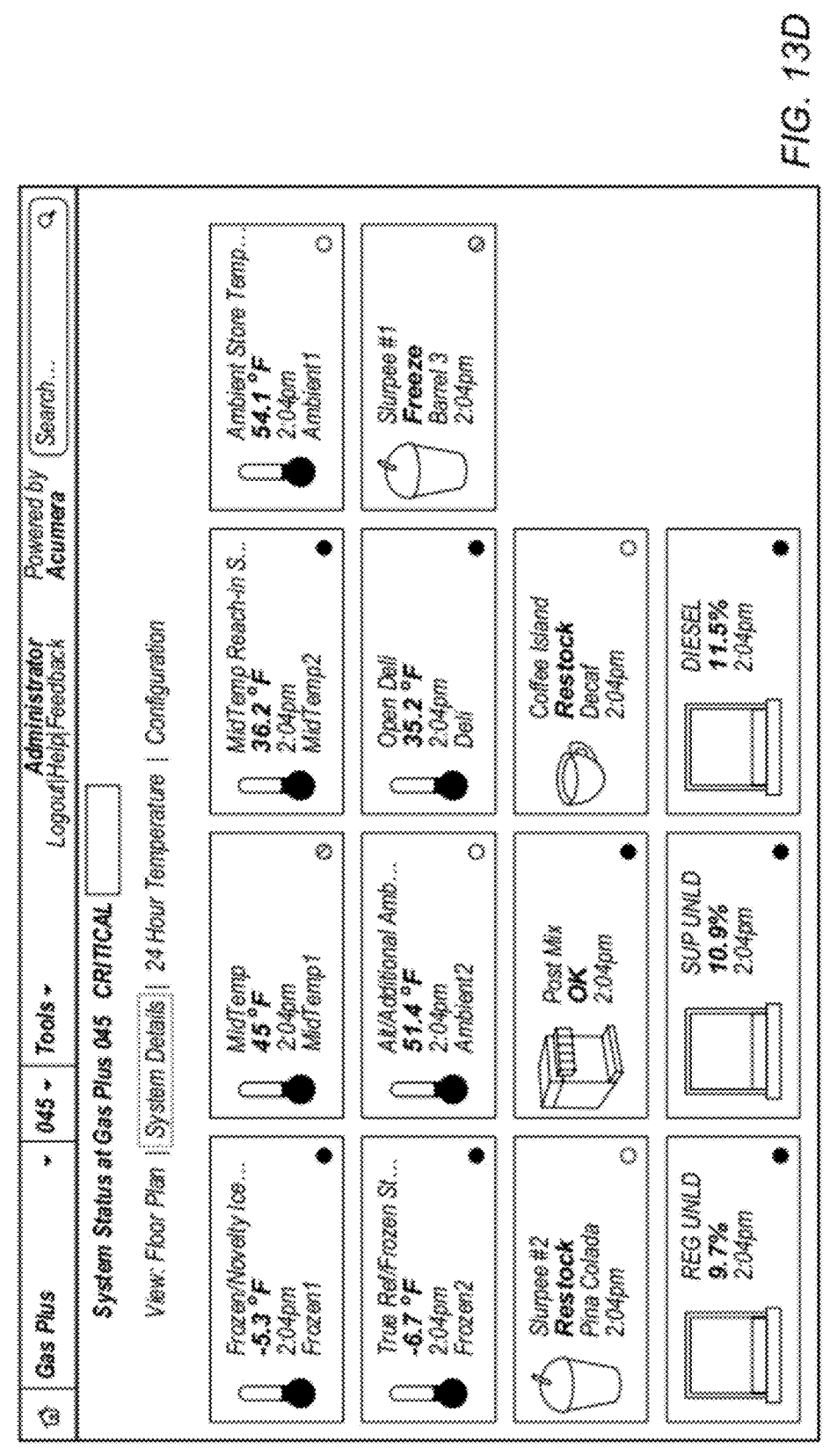

FIG. 13D illustrates the resulting screen when the user selects "Gas Plus 045", which as shown in FIG. 13A (dashed) is in critical condition. FIG. 13D illustrates an exemplary status screen where the user can quickly view reported information for each of the devices managed at the selected store. As shown, various ones of the premise devices are in critical condition, including a freezer, an ice cream machine, the open deli, a mid temp refrigerator, a fountain drink dispenser, and the three fuel tanks (regular, super, and diesel). The status screen also indicates that slurpee machine 1 and one of the refrigerators is in a warning condition, and slurpee machine 2, the coffee island, and the air conditioning units are in "OK" condition. The status screen further indicates that the coffee island and the slurpee machine 2 should be restocked. As also shown, the user may be able to view the floor plan (shown in FIGS. 13E and 13F), 24 hour temperature screens, configuration screens, etc.

Figure 13E:
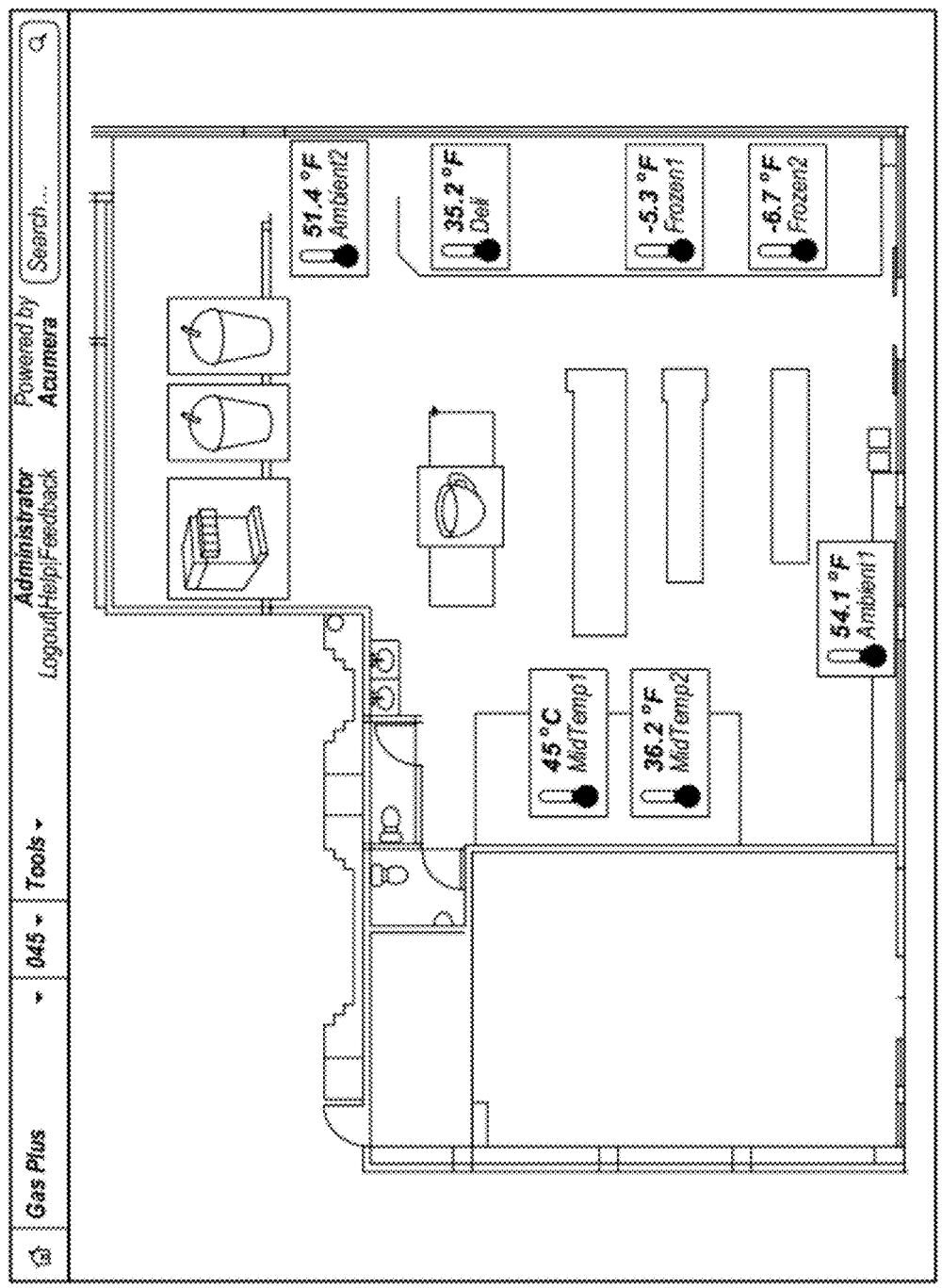
Figure 13F:
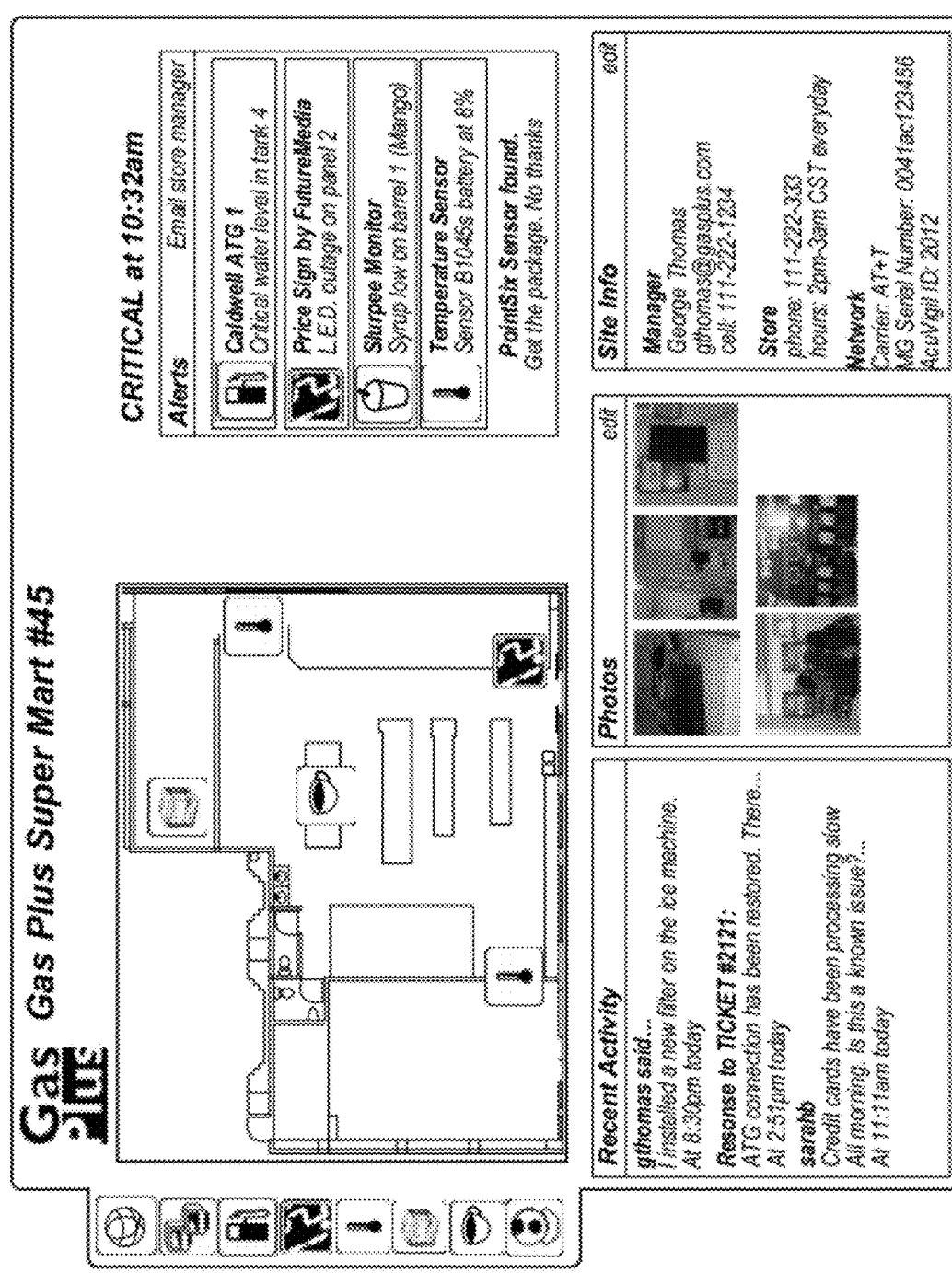

FIG. 13E illustrates a floor plan of the convenience store, with indications for the location of each of the premise devices inside of the convenience stores. In some embodiments, the floor plan may also indicate the status and condition of the various premise devices (e.g., via color coding or other methods, as desired). FIG. 13F illustrates an alternative user interface, similar to the floor plan of FIG. 13E. As shown in FIG. 13F, there may be a floor plan section, which may be similar to that shown in FIG. 13E. As also shown in FIG. 13F, on the left side, there may be an application dashboard, e.g., where a user can select each of the icons to select and view an interface of an installed application. As shown on the right side, the interface may include an alerts section where any critical or warning conditions (e.g., as reported by installed applications) can be viewed. As also shown, the user may select a "email store manager" to alert the store manager to one or more of the alert conditions. In the recent activity section, the interface may display any recent messages posted regarding the selected store. In this section, a user may also be able to post various messages to the recent activity portion. The photos section illustrates photos of the location. In some embodiments, the photos may correspond to installation of the premise devices shown in the floor plan section. The site info section illustrates various contact information and relevant location information. As shown, the site info section shows the location information of the location, the contact information of the manager, and the network that provides connectivity for the location.

Figure 13G:
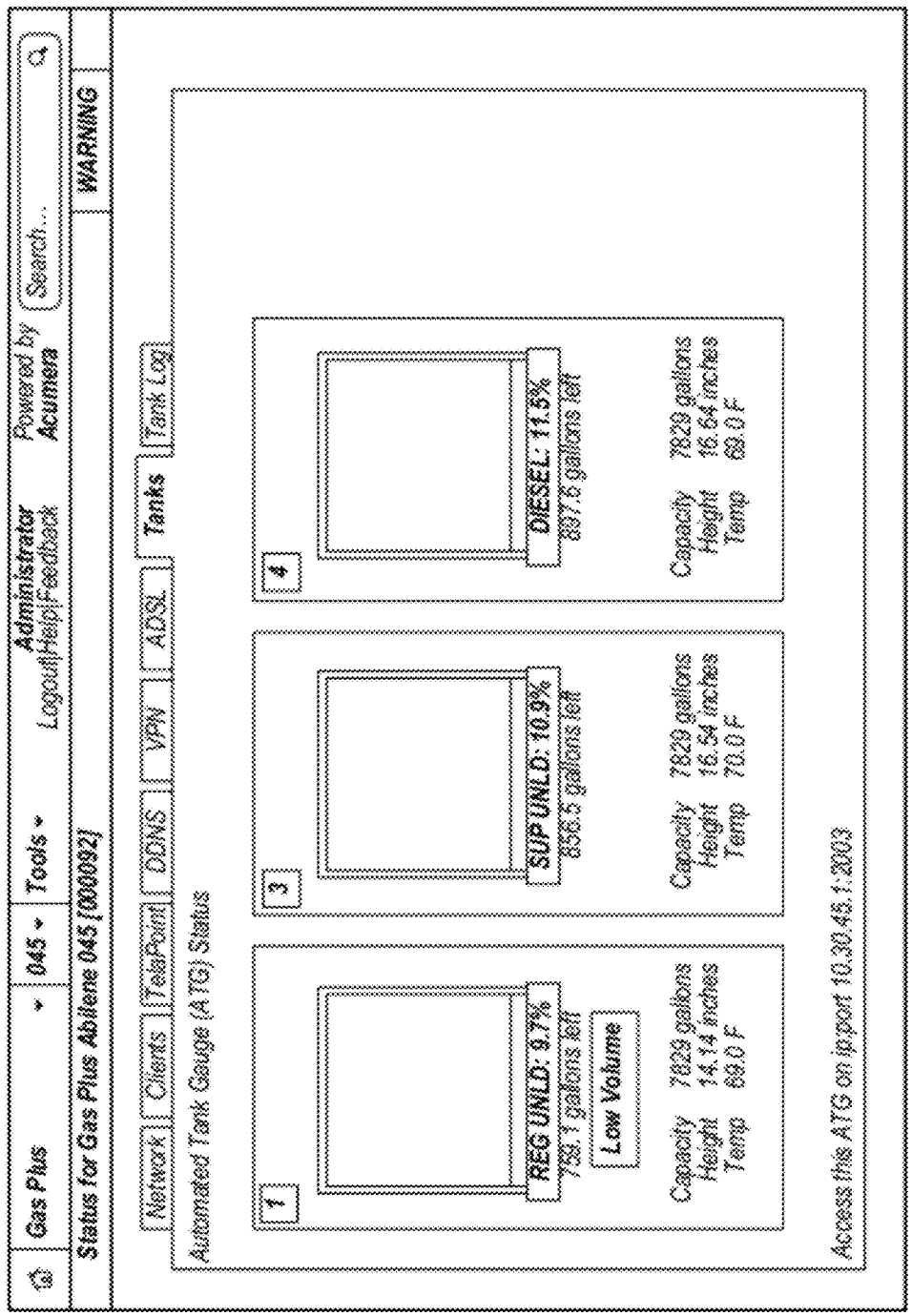

FIG. 13G illustrates a status screen for each of the fuel tanks at the convenience store. FIG. 13G may be accessed via selection of one or more of the fuel tanks or the configuration in FIG. 13D, among other possible methods. As shown, the volume of gas and status of each fuel tank may be visually and/or textually indicated in this interface. As shown, the regular unleaded tank is 9.7% full, the super unleaded tank is 10.9% full, and the diesel tank is 11.5% full. The interface also indicates the capacity for each tank, the height for each tank, and the temperature for each tank. Additionally, as shown, the regular unleaded tank is in condition "warning" because the volume is less than 10%, although other thresholds are envisioned. FIG. 13G also illustrates a variety of other screens the user can access, such as "network", "clients", "telapoint", "DDNS", "VPN", "ADSL", and "Tank Log", among other possibilities.

FIG. 13H illustrates an exemplary configuration interface. In this interface, the user may specify various ranges for conditions of each of the premise devices (or the ranges may be predetermined by the manufacturer of the devices or the developer of the application, as desired). For example, in this exemplary interface, the condition for the gas tanks are "OK" when the percent of gas is above 10, in a warning condition between 5 and 10 percent, and critical when below 5%. Similarly, for the ambient temperature (e.g., the A/C or heating units), there condition is ok between 50 and 70 degrees Fahrenheit and warning when the temperature is outside of that range. Other ranges are shown for the various other devices. As also shown, the user may save the configuration and add new configurations for other devices.

Figure 13I:
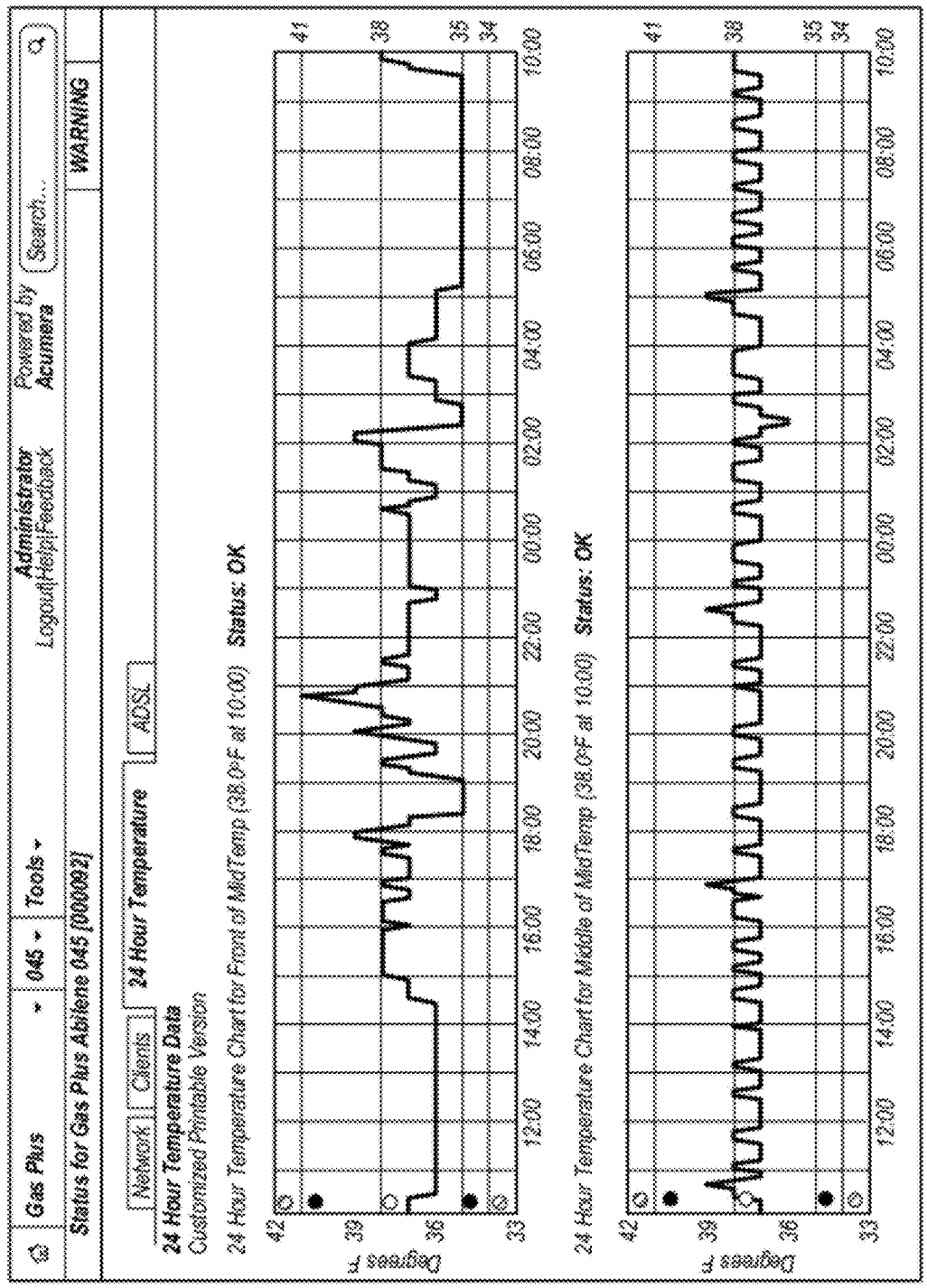
Figure 13J:
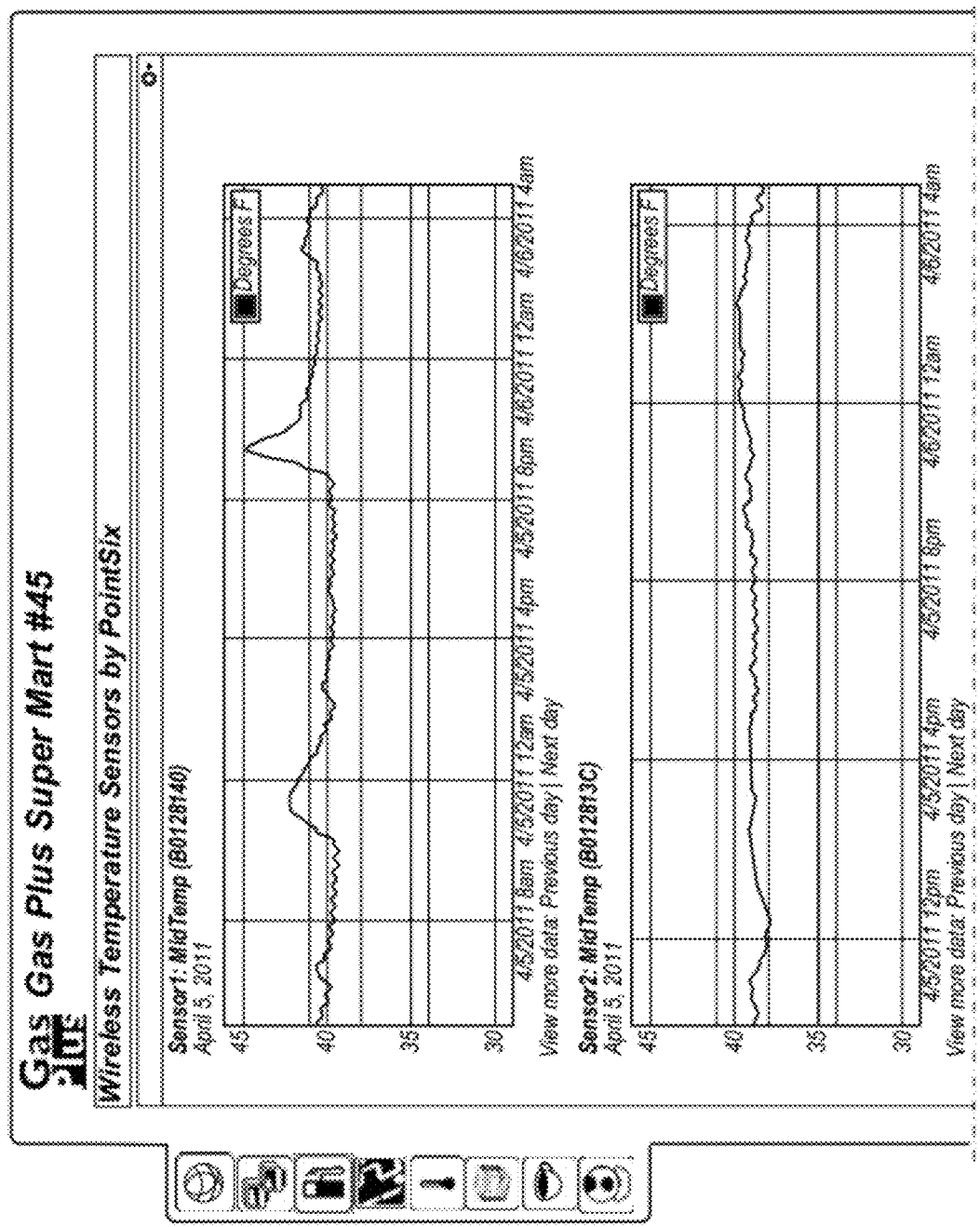

FIG. 13I illustrates an exemplary temperature screen where a user may be able to view the temperature over time of various premise devices. As shown, the first mid temp refrigerator has largely been within the ok range (indicated via colors or, in the case of FIG. 13I, via horizontal lines in the graph and condition indicators) but has been in the warning range several times (e.g., when a door to the refrigerator is left open or during other times). The second mid temp refrigerator is much more consistent and illustrates temperature changes due to the turning on and off of the compressor. FIG. 13J provides an alternate interface that displays similar temperature graphs of FIG. 13I.

Figure 13K:

FIG. 13K illustrates an exemplary interface for showing the current status of electronic signs. As shown, the E85 fuel on both sides of the sign is at a price of $4.19 and the biodiesel fuel on both sides of the sign is at a price of $4.24. As also shown in the interface, the status of one of the signs is "L.E.D. outage on panel 2" indicating there is a problem with the sign that should be fixed. In one embodiment, the user may select the "order parts" or "contact FutureMedia" to address the problem. In further embodiments, the parts may be automatically ordered and/or the manufacturer may be automatically contacted.

Figure 13L:
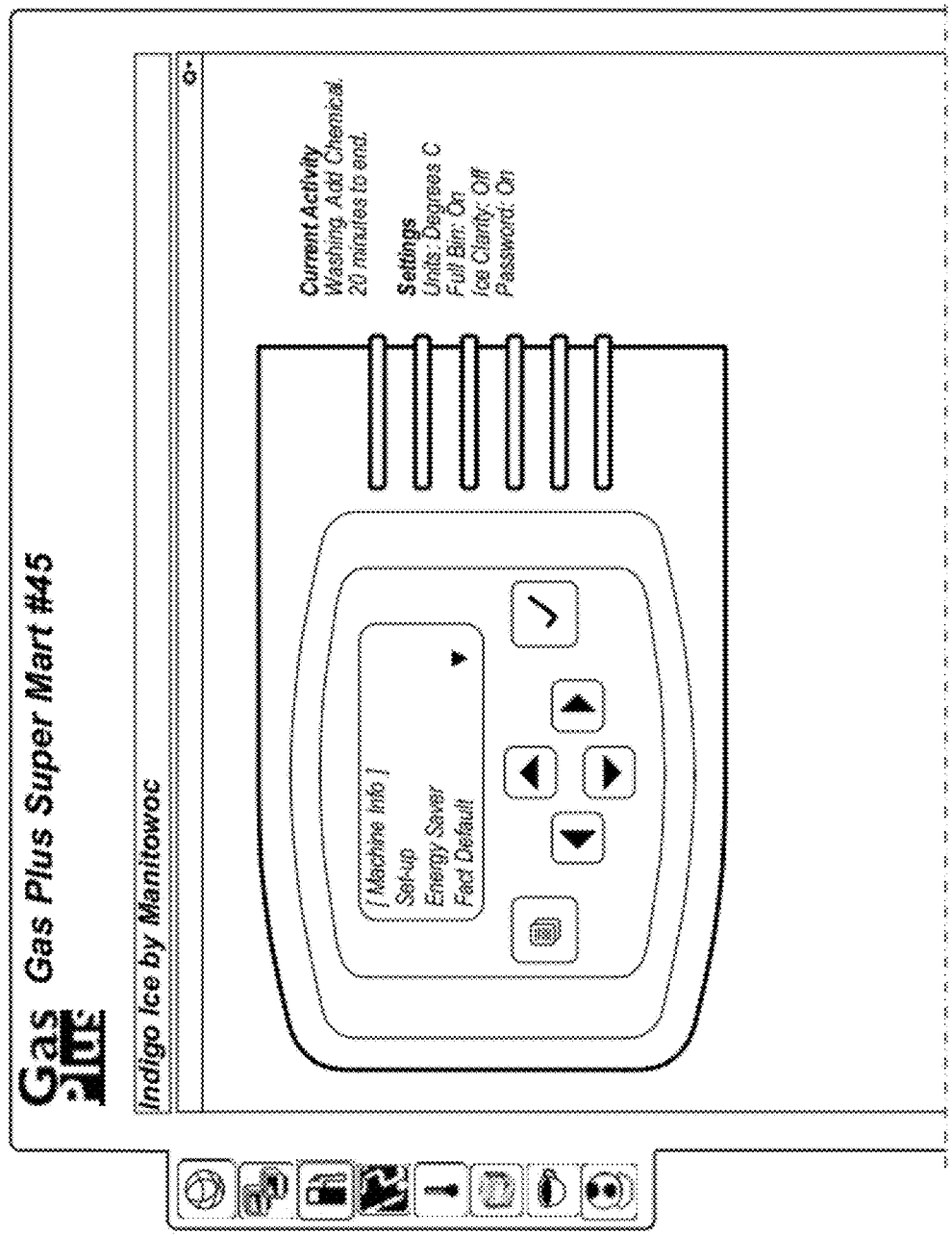

FIG. 13L illustrates an exemplary interface for a Manitowoc™ Ice Machine. The interface of FIG. 13L may be similar to the physical interface of the physical machine located at the location. Additionally, the interface illustrates the current status (washing, add chemical, 20 minutes to end) as well as the current settings.

Thus, FIGS. 13A-13L illustrate exemplary screen shots where a user can view reported information from any of a plurality of different stores and modify configurations of the devices and/or interface.

Figure 14A:
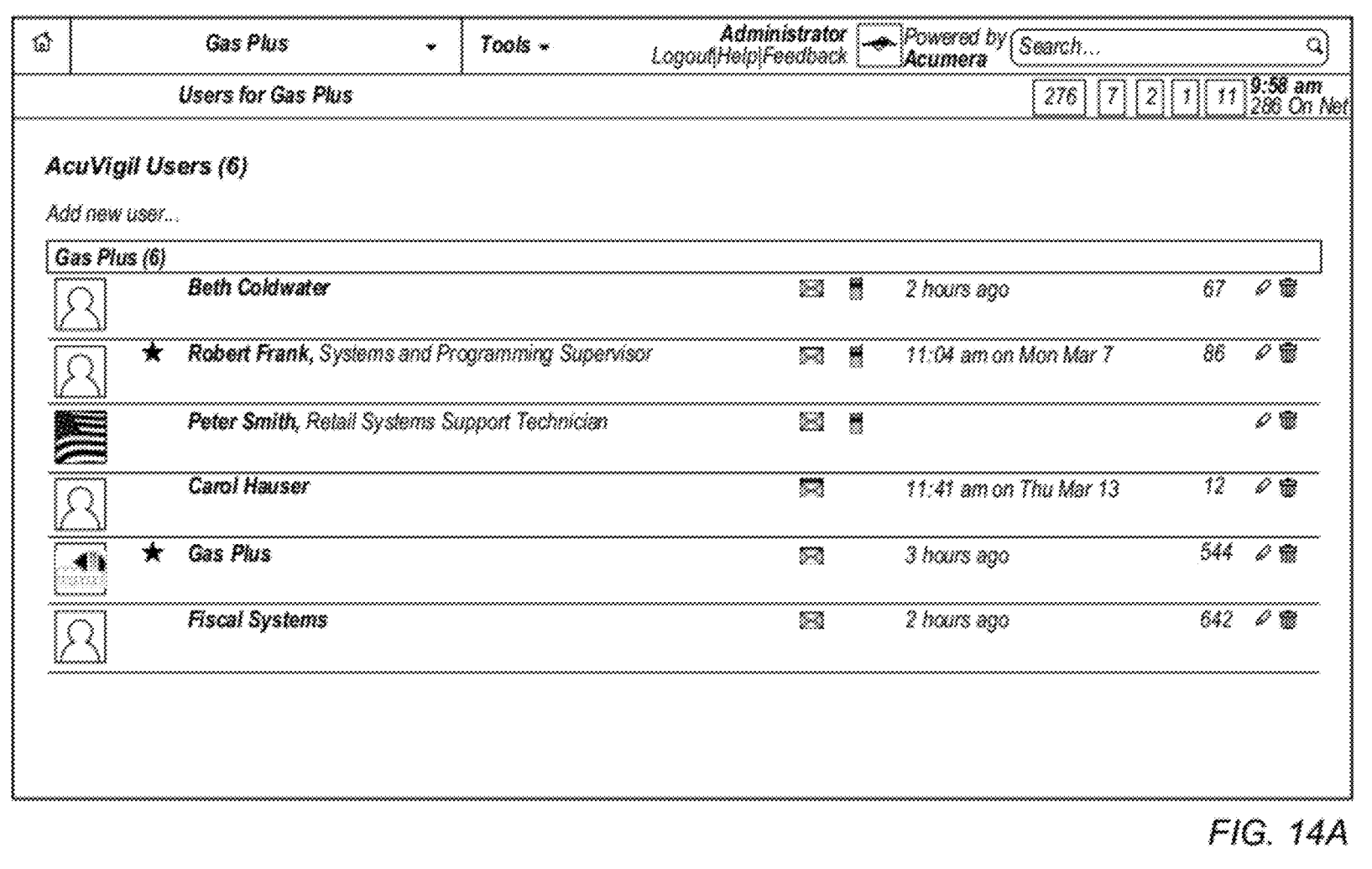
Figure 14C:
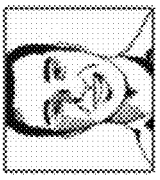

FIGS. 14A-14D illustrate exemplary interfaces for managing users and support tickets for a location. As shown in FIG. 14A, users associated with a location are displayed. More specifically, FIG. 14A shows the six users associated with the Gas Plus location: Beth Coldwater, Robert Frank, Peter Smith, Carol Hauser, Gas Plus, and Financial Systems.

The interface also shows the last time each user has accessed the location, links for contacting each user (e.g., via email, SMS, or other means), and the ability to edit or remove users.

FIG. 14B illustrates open tickets for Gas Plus. As shown, there is a ticket that indicates that the gateway device of Gas Plus location 233 is not reporting. As also shown, this ticket is assigned to Mark Wagner and the ticket was last updated by Chris Michaels. As also shown, there is an open ticket to increase the range and bandwidth of pico stations at Gas Plus locations.

FIG. 14C illustrates an interface for viewing the non-responding gateway device ticket of FIG. 14B. As shown in this interface, the ticket was opened by Doug Henning at 10:52 on April 16. The interface also indicates each of the updates to the ticket, the participants who are emailed regarding the ticket (e.g., whenever updates occur for the ticket), a method for responding or updating the ticket (e.g., by typing and submitting a message in the form), and the ability to add more tickets.

Figure 14D:
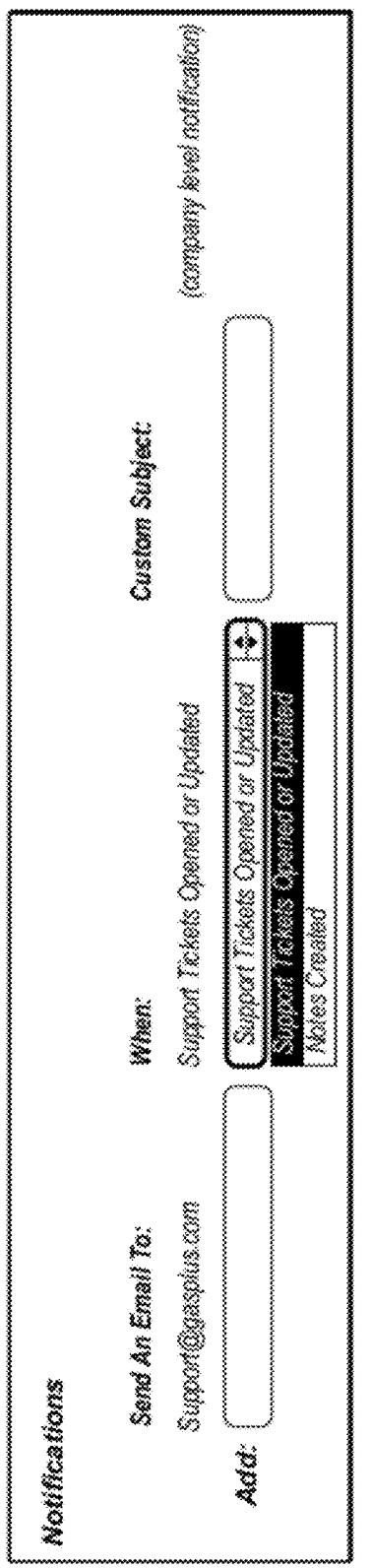

FIG. 14D is an interface to add notifications, e.g., for a support ticket. As shown, the current interface shows that the email address "Support@gasplus.com" receives emails whenever tickets are opened or updated. As also shown, a custom subject may be provided (e.g., for automatic email sorting or filing) and additional email addresses may provided according to different conditions (e.g., when notes are created).

Thus, FIGS. 14A-14D illustrate exemplary interfaces that may be used in the described method.

Figure 15A:
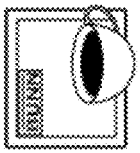
Figure 15B:
Figure 15C:
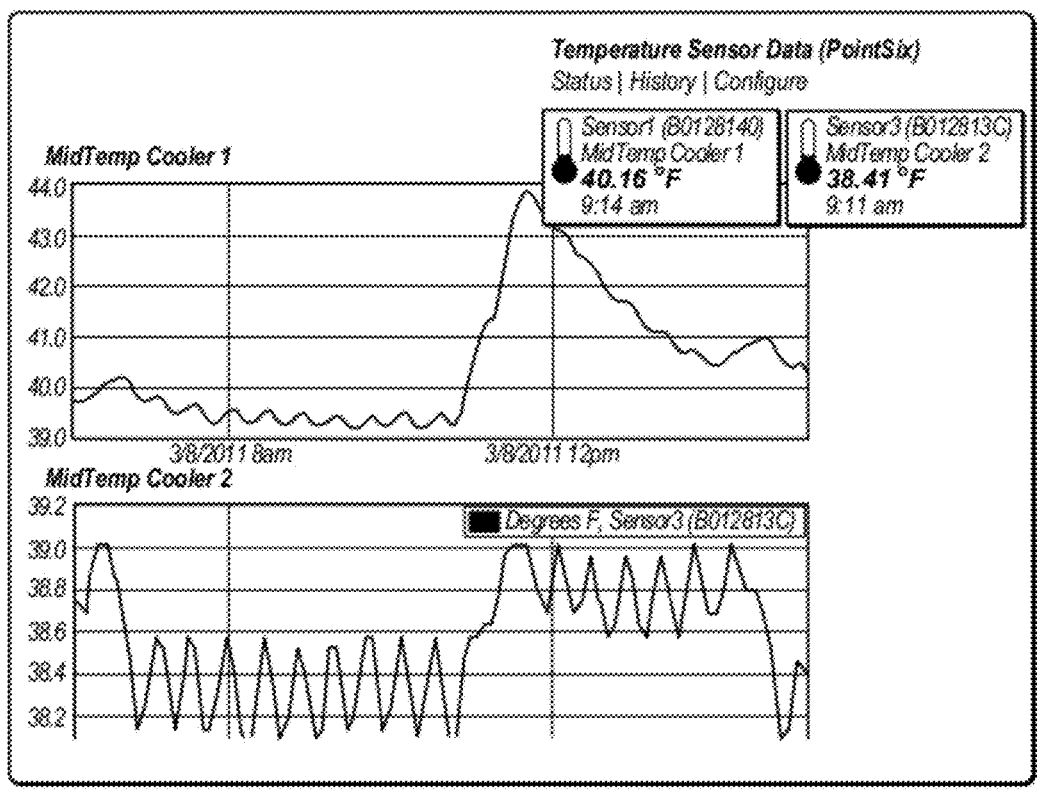

FIGS. 15A-15C illustrate an exemplary interface for purchasing applications or packages, e.g., from an application store or package warehouse.

As shown in FIG. 15A, the user may view current packages, e.g., that are purchased or installed. In this case, the user has a "fuel monitoring" package which is installed on 76 sites, a "Bunn Coffee-O-Matic" package installed on 64 sites, a "FutureMedia Sign" package installed on 4 sites, an "Energy Monitor" package installed on 22 sites, and a "Slurpee Monitor" package installed on 101 sites. In some embodiments, a user can select a package name to see locations using the package.

The exemplary interface of FIG. 15A also has a "Find More Packages" portion where a user may browse through different aisles (e.g., categories) of the package warehouse or browse different vendors, although other browsing techniques are envisioned. FIG. 15A further includes an indication of various detected devices (PointSix People Counter, Hoshizaki Ice Machine, Bunn PostMix Machine) that may require packages. In one embodiment, the user may click on these detected devices to browse for compatible or suggested packages for those devices, e.g., for installation.

FIG. 15B illustrates another interface where the user may view various temperature monitoring packages (e.g., after selecting the "temperature" aisle in FIG. 15A. In this case, the user may select to install the "PointSix Wireless Temperature Monitoring" package (described as "Easy install sensors. Real-time temps and food safety reports. $12/month per store), the "Aginova Wireless Temperature Monitoring" package (described as "Streamlined sensors. Real-time status and simple graphs. FREE (AGinova sensors required)"), and/or the "Compressor Monkey" package (described as "Device pre-installed on major brand new compressors. Real-time warning alerts. Prevent inventory loss. $8/month per store"). The user may install these packages by selecting the install button for each of the packages. As also shown, the user may browse more packages using a browsing interface similar to that of FIG. 15A, although other browsing interfaces are envisioned.

FIG. 15C illustrates a more detailed description of the "PointSix Wireless Temperature Monitor" package, which may be viewed upon selection of that package. As shown in FIG. 15C, the package is described as:

PointSix Wireless Temperature Sensor makes it easy to monitor temperature at any location in your store. Simply attach the sensor to the wall and you are ready to go. AcuVigil seamlessly detects the sensors and this package provides you with real-time data, both current status and history. Set your customized temperature ranges so you can quickly see if the monitored area is within target range. Place inside coolers, deli cases, and other refrigerated zones for automatic food safety reports. FIG. 12C also shows an exemplary graph that may be provided by the application once installed.

Thus, FIGS. 15A-15C illustrate an exemplary package installation interface. Further interfaces are envisioned, e.g., where the user specifies an installation location for already purchased applications, or during the purchase process. In some embodiments, the user may browse compatible packages for a specific device (e.g., a managed device, a user device, a gateway device, etc.) or the user may browse packages and then select installation target(s) for the selected packages. Thus, the above interfaces are exemplary only and further interfaces for browsing and installing packages are envisioned.

Figure 16:
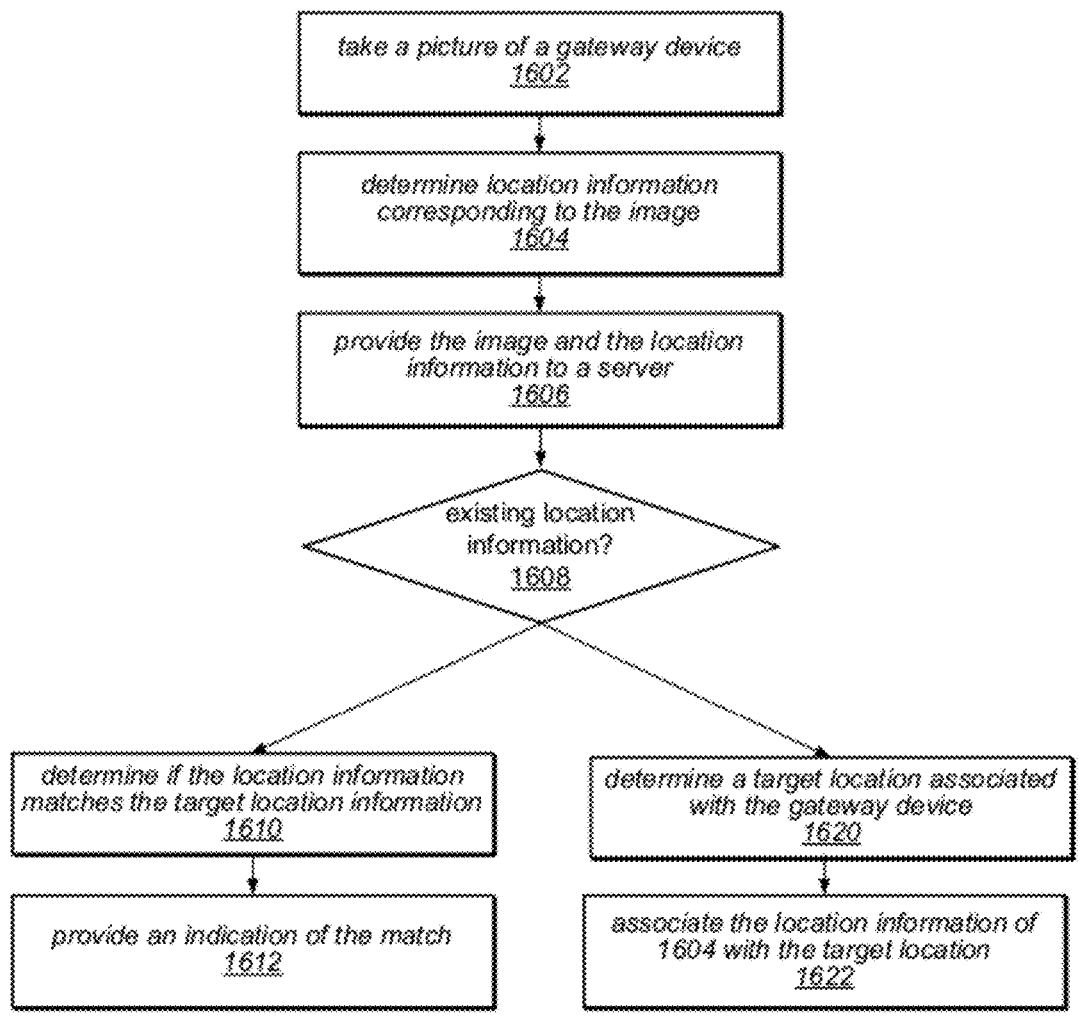
FIG. 16 is a flowchart diagram illustrating an embodiment of a method for installing a gateway device.

FIG. 16—Installing a Gateway Device

FIG. 16 is a flowchart diagram illustrating one embodiment of a method for installing a gateway device. The method shown in FIG. 16 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1602, a picture of a gateway device may be taken, e.g., at the time of installation of the gateway device or upon reaching the target location for installing the gateway device. For example, a technician that is about to install the gateway device at the target location may initially take this picture of the gateway device, e.g., to confirm that he is at the correct location.

In one embodiment, the picture of the gateway device may be of an image on the gateway device that uniquely identifies the gateway device. For example, the image may be a scan code, such as a bar code, a quick response (QR) code, etc. The scan code may encode a unique identification code for the gateway device (e.g., a serial number or other unique identifier). The picture may be taken by any of various devices, such as a camera, smart phone, or any device with image capturing capabilities.

In 1604, location information may be determined at the same location as where the picture is taken in 1602 above. For example, in one embodiment, the device that captured the image in 1602 may also be configured to capture location information, e.g., automatically. More specifically, in one embodiment, the device may include GPS circuitry and may determine latitude and longitude coordinates of the device at the time the picture was taken. Other methods for gathering location information are envisioned, e.g., cell tower triangulation, based on nearby access points or hotspots with known locations, etc. Further, the location information may be any information that identifies the location, e.g., including lat/long coordinates discussed above, addresses, etc.

In 1606, the image and the location information may be provided to a server. In one embodiment, the location information may be included in the image (e.g., within metadata of the image). The image and location information may be provided at approximately the same time as when the picture was taken (e.g., using a data connection, such as using a smart phone). Alternatively, the image and location information may be provided at a later time, although this may be less desirable for installations (e.g., when ensuring that the installation is at the correct location).

The server may be any of the servers discussed above, e.g., which keep track of the various gateway devices. In one embodiment, the server may store a database which includes various locations (e.g., for merchants, convenience stores, homes, etc.) as well as associated location information (e.g., lat/long coordinates). The database may also include a field for associated gateway device(s), e.g., storing unique information associated with each gateway device, such as the information indicated by the image of 1602 above.

In 1608, there may be at least two conditions to evaluate. First, where location information of the target location is already known, the method may continue to 1610. Alternatively, where the location information of the target location is not known (e.g., the specific lat/long coordinates are not known), the method may continue to 1620.

In 1610, the method may determine if the determined location information from 1604 matches the target location information, e.g., stored in the database. For example, the method may match the unique identifier of the gateway device (from 1602 above, e.g., after decoding the image to determine the unique identifier) with a target location and then determine location information of the target location for matching. Alternatively, the method may simply attempt to match the determined location information with any location information, e.g., stored in the database. In this embodiment, where there is a match and the gateway device was not previously associated with the target location, the unique identifier of the gateway device may then be associated with the target location, e.g., in the database.

The determination of the match may be based on thresholds, e.g., where the specific lat/longs do not match exactly (which is likely). For example, the threshold may be if the two sets of location information are within 10, 20, 30, 50 feet of each other. In one embodiment, the threshold may vary depending on the particular location. For example, for embodiments where the locations correspond to convenience stores, if the urban density is very low or if there are no other convenience stores nearby, then the threshold may be relatively lax (e.g., within a mile of the target location); however, where there are several convenience stores in a close proximity (e.g., at the same intersection), the threshold may be much smaller (e.g., less than 25 feet).

In 1612, an indication of whether the location information matches the target location information may be provided, e.g., to the user who took the picture in 1602 above. For example, where the image was taken via a smart phone (or other mobile communication device), the notification may be provided to the smart phone, or even another device associated with the user, as desired.

This branch of the method may be particularly useful for ensuring that technicians are installing the gateway device at the proper target location. For example, following the embodiment discussed above where there are multiple convenience stores within a small radius, technicians may often attempt to install the gateway device at the wrong location, which is an inefficient use of time. By following the 1610-1612 branch, it may be ensured that the gateway device is installed at the proper location.

Turning now to 1620, where the location information of the target location is not known, the method may determine a target location associated with the unique information indicated by the image (e.g., by decoding the image to determine the unique information).

After determining the target location in 1620, the location information determined in 1604 may be associated with the target location and/or gateway device in 1622. For example, the database may be updated to include the location information in an entry associated with the target location and/or gateway device.

The various steps discussed above (e.g., 1608-1622) may be performed by the server. Alternatively, various information usable for performing those steps may be provided from the server to a device (e.g., the device that captured the image) which may be configured to implement the steps above. For example, the target location information may be provided by the server and the matching may be performed by the device itself. In this embodiment, the location information determined in 1604 may not be necessarily provided to the server, e.g., the server may provide the target location information based on the image of the gateway device and the device may perform the matching using the target location information.

While the method of FIG. 16 is described above with respect to gateway device installation, it may also apply to database clean-up. For example, a technician may service a particular location (e.g., a gateway device at the particular location). Accordingly, the steps described above may be performed after installation. In this case, previous location information may have already been stored, but may be incorrect or inaccurate. Accordingly, the new location information may be used to overwrite the old location information associated with the target location, e.g., in the database. Thus, the method may be performed similar to 1620 and 1622 above, except for overwriting previous location information rather than providing new location information.

Further Embodiments

In some embodiments, the user may be able to configure automatic purchases of products, e.g., as the devices indicate the need or desirability to make the purchases. For example, an application may be able to determine that a filter should be replaced for an A/C unit. Accordingly, the application (or an associated application) may be able to order a new filter or request service of the A/C unit automatically without an employee or manager having to deal with the issue. Similarly, when inventory of a product is low, more of the product may be automatically ordered (e.g., coffee filters, grocery products, fuel for a fuel tank, refrigerant for a refrigerator, etc.). Thus, applications may be configured to automatically purchase items as the need arises, as desired.

Some applications may be default or "irreplaceable" applications that are always installed on gateway devices (or always installed for specific types of gateway devices). For example, one such application may be a device reporting application that maintains a list of premise devices that are detected and/or controlled by the gateway device. A user may be able to use the application to view or manage premise devices connected to the gateway device. Accordingly, such an application may be installed on every gateway device. Such applications may not be removable from the device (e.g., a user may not be able to remove the application from the gateway device or management server). However, third parties may develop an application with a similar purpose as one of these default or irreplaceable applications. In one embodiment, the third party and/or the application server may mark the application as a replacement (or candidate for replacement) for the default or irreplaceable applications. Accordingly, when such an application is selected for installation, the original application may be removed and replaced with the new application (e.g., in response to user input confirming the replacement or automatically, as desired). In some embodiments, the new application may be associated with a newer device (or piece of hardware). For example, a user may purchase a new switch which may have nicer features with respect to device management. Accordingly, the user may install a corresponding application that is able to use these nicer features. However, the replacement application may be purely functional (e.g., not associated with new hardware or a specific hardware device) and the user may simply wish to replace the original default software application with a different third party application (e.g., which is better or that the user prefers).

In some embodiments, manufacturers (or other entities) may provide services or products in response to detected activity. For example, a manufacturer may specify a maintenance schedule for a premise device that helps ensure that the device lasts for its operation lifetime. As one example, an HVAC unit may have a maintenance schedule where Freon (or a corresponding substitute) is replaced every six months (or before a certain level is reached) and air filters are replaced every 6 months. Since the gateway device may be able to monitor the condition of the premise device, the method may be able to determine whether or not the prescribed maintenance schedule has been followed. For example, if a manufacturer (or other entity) determines that the maintenance schedule has been followed (e.g., using reported information), the manufacturer may extend the warranty on the premise device, lower future maintenance costs, lower the cost a service contract, lower costs of future purchases or services, provide a free product (e.g., a free air filter for an HVAC), etc. Accordingly, the customer may be rewarded for properly maintaining the equipment, and the manufacturer can maintain its reliability standards. Conversely, a manufacturer (or other entity) may be able to monitor the condition or maintenance of a premise device and determine that the maintenance schedule is not being followed and/or the premise device is not being operated as intended. Accordingly, the manufacturer (or a warranty provider) may revoke or shorten the warranty since the user is not meeting the terms of the warranty agreement.

In one embodiment, one of the applications may assist in performing external security scans of the gateway device. For example, in order to handle sensitive information, such as credit card information, the gateway device may need to be periodically scanned for vulnerabilities (e.g., a security company may attempt to penetrate the gateway device in order to steal the sensitive matter). Since the gateway devices will typically have a dynamically assigned IP address, performing these scans are somewhat difficult for a third party. Accordingly, one of the applications may determine the IP address of the gateway device and submit a scanning request to a security company to perform the scan (e.g., a PCI scan). That application may be developed and/or associated with security company. Additionally, the result of the security scans or attempts to hack the gateway device may be provided via the management server using the application.

In some embodiments, one of the applications may take photographs in response to various conditions at the location. For example, since refrigerators typically have increased temperatures when a door is opened (e.g., above a food safety level), a corresponding camera may be directed at the refrigerator door. The camera may be configured to take a photograph whenever the door is opened and/or whenever the temperature exceeds a warning or critical level. Accordingly, a manager of the store may be able to monitor and determine which employee is routinely causing the temperature to increase above the threshold level (e.g., by leaving the door open). The camera may also be used to keep track of security issues (e.g., employees stealing food from the refrigerator, etc. This concept may be performed by an application (e.g., an application that control the camera to take the picture in response to detected stimuli or alerts). The concept may be extended to performing any action (e.g., controlling action) based on stimuli occurring at the location.

In some embodiments, each application and/or device may have a security policy. For example, applications that handle sensitive information (e.g., credit card information) may be executed in a different portion of the gateway device (e.g., by secure logic of the gateway device) in order to securely handle the information. In some embodiments, security policies may dictate how applications, devices, and/or third parties (e.g., communicating with the gateway device over the Internet) are able to communicate. For example, an application for monitoring fuel tank devices may have a security policy that only allows communication with the fuel tank devices, and not, for example, devices that handle financial information. Similarly, the fuel tank devices (or applications associated therewith) may only provide the reported information to specific servers or third parties over the Internet. The security policy may be implemented by the gateway device and/or management server. For example, the gateway device may control how an application communicates with devices controlled by the gateway device as well as how the application provides information to third parties, e.g., over the Internet.

In one embodiment, an application may request to communicate with one of the premise devices controlled by the gateway device, and the gateway device may determine whether or not that application is allowed, based on the security policy. In this embodiment, the gateway device may use rules to determine that a electronic sign application is only able to control or retrieve reported information from electronic signs, and not any other device. Accordingly, the request may be accepted if it meets the security policy and rejected if it does not. Similarly, an application may request to communicate with a server or other entity over a network, such as the Internet. The gateway device may determine whether the communication is allowed using a security policy. For example, the application may only be allowed to communicate with specific IP addresses, domain names, etc., and may not be allowed to access other entities on the Internet (in order to protect the reported information).

Similarly, third party communications may be controlled as well. For example, in one embodiment, all outside communication may be prohibited. In other embodiments, a server associated with a device or application may be allowed to provide incoming communications, but the communications may be restricted to certain applications or devices. For example, communications from the energy company may be restricted to applications or devices associated with that energy company. Similarly, any device communications may be controlled via security policies.

Thus, the security policies may be used to control communications between third parties, applications, and/or devices. The security policies may also be extended to providing information to or receiving information from third parties on the cloud server (e.g., the management server), devices associated with users, etc.

Alternatively, or additionally, some applications may communicate over a VPN based on security policies. Further types of policies may be assigned to each application, e.g., within a user interface provided by the management server.

Exemplary Use Cases and Applications

The following provides exemplary locations and corresponding examples of use that may apply to the methods described herein.

The owner of an automatic (coin-op) car wash wants to be notified via text message when there is a fault in the carwash. So, he downloads a free application from the car wash manufacturer through the server. Later, the owner decides he wants to be able to view consumable levels remotely and/or be notified when consumable fluids (soap, wax, etc.) are low so he upgrades and purchases the premium application. He later decides he would like to automatically purchase consumables and makes a configuration change in the application allowing in-application purchases. In one embodiment, the managing company of the gateway device or server may collect a fee for the initial premium application purchase and for each in-application purchase.

A busy homeowner wants to be able to adjust her thermostat remotely because she frequently forgets to turn it up when she goes out of town for a race. So, she downloads the free thermostat application from the appropriate manufacturer from the server. Later, when she finds the air filter to be long-overdue for a change, she upgrades the application to a premium application that monitors air flow and knows when it is time to change the filter. In-application purchases allow her to purchase and have a new filter sent to her house. In some embodiments, the filter may be purchased automatically without her requesting the purchase. Similar to above, the managing company of the gateway device or server may collect a fee for the initial premium application purchase and for each in-application purchase.

An owner of a convenience store wants to ensure that the information controlled by his gateway device is secure. Accordingly, the owner downloads a "freemium" application for performing security scans. The application may allow for an unlimited number of local scans (e.g., within the network, possibly against an internal firewall of the gateway device). However, once set up properly, the owner may then make an in-application purchase (e.g., a signing a monthly contract) for performing periodic vulnerability scans of the gateway device from an external server. The application may be configured to determine the IP address before each scan (e.g., where the IP address is dynamically assigned), report the IP address to the external server, and the external server may perform the external scan for the owner. The owner then may receive an email or may otherwise view the results of the scan (e.g., the report may be provided on the management server or within an application that is executed by the owner's smart phone).

Although the embodiments above have been described in considerable detail, numerous variations and modifications will become apparent to those skilled in the art once the above disclosure is fully appreciated. For example, while many of the embodiments above are described with respect to a cloud server, simpler embodiments involving a single server are also envisioned. It is intended that the following claims be interpreted to embrace all such variations and modifications.

The invention claimed is:

1. A non-transitory computer readable memory medium comprising program instructions for automatically configuring a gateway device, wherein the program instructions are executable to:
   detect a gateway device that is deployed at a location;
   receive an indication of a plurality of premise devices coupled to the gateway device at the location;
   automatically determine a plurality of applications to be deployed on the gateway device, wherein said automatically determining is based on the indication of the plurality of premise devices coupled to the gateway device;
   provide executable instructions of the plurality of applications to the gateway device over a wide area network, wherein the gateway device is configured to execute the instructions of the plurality of applications, and wherein a first portion of a first application of the plurality of applications is executable by the gateway device to manage a first premise device of the plurality of premise devices at the location;
   automatically install a second portion of the first application on a server;
   execute the second portion of the first application on the server to provide a user interface for receiving input for managing the first premise device, wherein the first portion of the first application and the second portion of the first application are designed for distributed execution by the gateway device and the server;
   receive input to the user interface for managing the first premise device; and
   provide one or more commands to the first portion of the first application at the gateway device to manage the first premise device based on the received input, wherein the first portion of the first application is configured to use the one or more commands to manage the first premise device.

2. The non-transitory computer readable memory medium of claim 1, wherein the indication of the plurality of premise devices comprises identification information of each premise device coupled to the gateway device.

3. The non-transitory computer readable memory medium of claim 2, wherein the identification information identifies a type of each premise device.

4. The non-transitory computer readable memory medium of claim 2, wherein the identification information identifies a model of each premise device.

5. The non-transitory computer readable memory medium of claim 1, wherein the gateway device is a merchant gateway device of a merchant located at a merchant location.

6. The non-transitory computer readable memory medium of claim 5, wherein the merchant is a convenience store.

7. The non-transitory computer readable memory medium of claim 1, wherein the indication of the plurality of premise devices comprises a serial number of each of the plurality of premise devices.

8. The non-transitory computer readable memory medium of claim 1, wherein the indication comprises identification information of the first premise device coupled to the gateway device, wherein said automatically determining the plurality of applications comprises determining the first application using the identification information of the first premise device.

9. The non-transitory computer readable memory medium of claim 1, wherein the indication comprises identification information for each of the plurality of premise devices, wherein said automatically determining the plurality of applications comprises determining one or more applications associated with each identification information.

10. The non-transitory computer readable memory medium of claim 1, wherein the program instructions are executable by one or more processors of a cloud server, wherein said automatically installing the second portion of the first application is performed on the cloud server.

11. The non-transitory computer readable memory medium of claim 1, wherein the gateway device is located at a home of a user, wherein the plurality of premise devices are located in the home of the user.

12. A method for automatically configuring a gateway device, comprising:
    at least one computer system detecting a gateway device that is deployed at a location;
    the at least one computer system receiving an indication of a plurality of premise devices coupled to the gateway device at the location;
    the at least one computer system automatically determining a plurality of applications to be deployed on the gateway device, wherein said automatically determining is based on the indication of the plurality of premise devices coupled to the gateway device;
    the at least one computer system providing executable instructions of the plurality of applications to the gateway device over a wide area network, wherein the gateway device is configured to execute the instructions of the plurality of applications, and wherein a first portion of a first application of the plurality of applications is executable by the gateway device to manage a first premise device of the plurality of premise devices at the location;
    the at least one computer system automatically installing a second portion of the first application;
    the at least one computer system executing the second portion of the first application to provide a user interface for receiving input for managing the first premise device, wherein the first portion of the first application and the second portion of the first application are designed for distributed execution by the gateway device and the server;
    the at least one computer system receiving input to the user interface for managing the first premise device of the plurality of premise devices; and
    the at least one computer system providing one or more commands to the first portion of the first application at the gateway device to manage the first premise device based on the received input, wherein the first portion of the first application is configured to use the one or more commands to manage the first premise device.

13. The method of claim 12, wherein the gateway device is a merchant gateway device of a merchant located at a merchant location.

14. The method of claim 13, wherein the merchant is a convenience store.

15. The method of claim 12, wherein the indication of the plurality of premise devices comprises identification information of each premise device coupled to the gateway device.

16. The method of claim 12, wherein the indication comprises identification information of the first premise device coupled to the gateway device, wherein said automatically determining the plurality of applications comprises determining the first application using the identification information of the first premise device.

17. The method of claim 12, wherein the gateway device is located at a home of a user, wherein the plurality of premise devices are located in the home of the user.

18. A non-transitory computer readable memory medium comprising program instructions for automatically configuring a gateway device at a location, wherein the program instructions are executable to:
    determine a plurality of premise devices coupled to the gateway device at the location;
    provide an indication of the plurality of premise devices to a server over a wide area network;
    receive executable instructions of a plurality of applications from the server over the wide area network, wherein the plurality of applications are automatically determined based on the provided indication;
    execute the executable instructions of the plurality of applications, wherein a first portion of a first application of the plurality of applications is executable to manage a first premise device of the plurality of premise devices at the location, wherein a second portion of the first application is installed on and executed by the server, and wherein the first portion of the first application and the second portion of the first application are designed for distributed execution by the gateway device and the server; and
    receive one or more commands from the second portion of the first application executing on the server to manage the first premise device of the plurality of premise devices, wherein said receiving the one or more commands from the server is performed in response to the server executing the second portion of the first application to provide a user interface for managing the first premise device and receive input from a user to manage the first device of the plurality of devices.

19. The non-transitory computer readable memory medium of claim 18, wherein the indication of the plurality of premise devices comprises identification information of each premise device coupled to the gateway device.

20. The non-transitory computer readable memory medium of claim 19, wherein the identification information identifies a type of each premise device.

21. The non-transitory computer readable memory medium of claim 19, wherein the identification information identifies a model of each premise device.

22. The non-transitory computer readable memory medium of claim 19, wherein the identification information identifies a serial number of each premise device.

23. The non-transitory computer readable memory medium of claim 18, wherein the program instructions are further executable to:
    upon establishing a network connection to the wide area network, automatically provide a message to the server to start the automatic determination and reception of the plurality of applications.

24. The non-transitory computer readable memory medium of claim 23, wherein the message comprises identification information of the gateway device.

25. The non-transitory computer readable memory medium of claim 18, wherein said determining the plurality of premise devices is performed automatically by the gateway device without receiving user input specifying the plurality of devices.

26. The non-transitory computer readable memory medium of claim 18, wherein said determining the plurality of premise devices comprises receiving user input identifying a premise device of the plurality of premise devices.

27. The non-transitory computer readable memory medium of claim 18, wherein the indication comprises identification information of the first premise device coupled to the gateway device, wherein the first application is automatically determined by the server for managing the first premise device coupled to the gateway device using the identification information of the first premise device.

28. The non-transitory computer readable memory medium of claim 18, wherein the gateway device is located at a home of a user, wherein the plurality of premise devices are located in the home of the user.

29. A method for automatically configuring a gateway device at a location, comprising:
   determining a plurality of premise devices coupled to the gateway device at the location;
   providing an indication of the plurality of premise devices to a server over a wide area network;
   receiving executable instructions of a plurality of applications from the server over the wide area network, wherein the plurality of applications are automatically determined based on the provided indication;
   executing the executable instructions of the plurality of applications, wherein a first portion of a first application of the plurality of applications is executable to manage a first premise device of the plurality of premise devices at the location, wherein a second portion of the first application is installed on and executed by the server, and wherein the first portion of the first application and the second portion of the first application are designed for distributed execution by the gateway device and the server; and
   receiving one or more commands from the second portion of the first application executing on the server to manage the first premise device of the plurality of premise devices, wherein said receiving the one or more commands from the server is performed in response to the server executing the second portion of the first application to provide a user interface for managing the first premise device and receive input from a user to manage the first device of the plurality of devices.

30. The method of claim 29, further comprising:
   upon establishing a network connection to the wide area network, automatically providing a message to the server to start the automatic determination and reception of the plurality of applications.

31. The method of claim 30, wherein the message comprises identification information of the gateway device.

32. The method of claim 29, wherein said determining the plurality of premise devices is performed automatically by the gateway device without receiving user input specifying the plurality of devices.

33. The method of claim 29, wherein said determining the plurality of premise devices comprises receiving user input identifying a premise device of the plurality of premise devices.

34. The method of claim 29, wherein the indication of the plurality of premise devices comprises identification information of each premise device coupled to the gateway device.

35. The method of claim 29, wherein the gateway device is a merchant gateway device of a merchant located at a merchant location.

36. The method of claim 29, wherein the gateway device is located at a home of a user, wherein the plurality of premise devices are located in the home of the user.

37. A non-transitory computer readable memory medium comprising program instructions for automatically configuring a gateway device, wherein the program instructions are executable by at least one processor of a server to:
   detect a gateway device that is deployed at a location;
   receive an indication of a plurality of premise devices coupled to the gateway device at the location;
   automatically determine a plurality of applications to be deployed on the gateway device, wherein said automatically determining is based on the indication of the plurality of premise devices coupled to the gateway device;
   provide executable instructions of the plurality of applications to the gateway device over a wide area network, wherein the gateway device is configured to execute the instructions of the plurality of applications, wherein a first portion of a first application of the plurality of applications is executable by the gateway device to manage a first premise device of the plurality of devices at the location;
   automatically install a second portion of the first application on the server;
   execute the second portion of the first application on the server to provide a user interface for receiving input for managing the first premise device, wherein the first portion of the first application and the second portion of the first application are designed for distributed execution by the gateway device and the server;
   receive input from a user for managing the first premise device of the plurality of devices; and
   provide one or more commands to the first portion of the first application at the gateway device to manage the first premise device based on the received input, wherein the first portion of the first application is configured to use the one or more commands to manage the first premise device.

38. The non-transitory computer readable memory medium of claim 37, wherein the gateway device is a merchant gateway device of a merchant located at a merchant location.

39. The non-transitory computer readable memory medium of claim 38, wherein the merchant is a convenience store.

40. The non-transitory computer readable memory medium of claim 37, wherein the indication of the plurality of premise devices comprises a type of each of the plurality of premise devices.

41. The non-transitory computer readable memory medium of claim 37, wherein the indication of the plurality of premise devices comprises a model of each of the plurality of premise devices.

42. The non-transitory computer readable memory medium of claim 37, wherein the indication comprises identification information of the first premise device coupled to the gateway device, wherein said automatically determining the plurality of applications comprises determining the first application using the identification information of the first premise device.

43. The non-transitory computer readable memory medium of claim 37, wherein the indication comprises identification information for each of the plurality of premise devices, wherein said automatically determining the plurality of applications comprises determining one or more applications associated with each identification information.

44. The non-transitory computer readable memory medium of claim 37, wherein the gateway device is located at a home of a user, wherein the plurality of premise devices are located in the home of the user.

45. A method for automatically configuring a gateway device, comprising:
   at least one computer system detecting a gateway device that is deployed at a location;
   the at least one computer system receiving an indication of a plurality of premise devices coupled to the gateway device at the location;
   the at least one computer system automatically determining a plurality of applications to be deployed on the gateway device, wherein said automatically determining is based on the indication of the plurality of premise devices coupled to the gateway device;
   the at least one computer system providing executable instructions of the plurality of applications to the gateway device over a wide area network, wherein the gateway device is configured to execute the instructions of the plurality of applications, and wherein a first portion of a first application of the plurality of applications is executable by the gateway device to manage a first premise device of the plurality of premise devices at the location;
   the at least one computer system automatically installing a second portion of the first application;
   the at least one computer system executing the second portion of the first application at the server to provide a user interface for receiving input for managing the first premise device, wherein the first portion of the first application and the second portion of the first application are designed for distributed execution by the gateway device and the at least one computer system;
   the at least one computer system receiving input from a user for managing the first premise device of the plurality of devices; and
   the at least one computer system providing one or more commands to the first portion of the first application at the gateway device to manage the first premise device based on the received input, wherein the first portion of the first application is configured to use the one or more commands to manage the first premise device.

46. The method of claim 45, wherein the gateway device is a merchant gateway device of a merchant located at a merchant location.

47. The method of claim 46, wherein the merchant is a convenience store.

48. The method of claim 45, wherein the indication of the plurality of premise devices comprises a type of each of the plurality of premise devices.

49. The method of claim 45, wherein the indication of the plurality of premise devices comprises a model of each of the plurality of premise devices.

50. The method of claim 45, wherein the indication comprises identification information of the first premise device coupled to the gateway device, wherein said automatically determining the plurality of applications comprises determining the first application using the identification information of the first premise device.

51. The method of claim 45, wherein the gateway device is located at a home of a user, wherein the plurality of premise devices are located in the home of the user.

52. A non-transitory computer readable memory medium comprising program instructions for automatically configuring a gateway device at a location, wherein the program instructions are executable to:
   determine a plurality of premise devices coupled to the gateway device at the location;
   provide an indication of the plurality of premise devices to at least one server over a wide area network, wherein the indication of the plurality of premise devices comprises identification information of each premise device coupled to the gateway device;
   receive executable instructions of a plurality of applications from the at least one server over the wide area network, wherein the plurality of applications are automatically determined based on the provided indication;
   execute the instructions of the plurality of applications, wherein a first portion of a first application of the plurality of applications is executable to manage a first premise device of the plurality of premise devices at the location wherein a second portion of the first application is executable by the at least one server to provide a user interface for receiving input for managing the first premise device, wherein the first portion of the first application and the second portion of the first application are designed for distributed execution by the gateway device and the at least one server; and
   receive, by the first portion of the first application, one or more commands from the at least one server to manage the first premise device, wherein said receiving the one or more commands from the at least one server is performed in response to the at least one server receiving input to the user interface to manage the first premise device.

53. The non-transitory computer readable memory medium of claim 52, wherein the gateway device is a merchant gateway device of a merchant located at a merchant location.

54. The non-transitory computer readable memory medium of claim 53, wherein the merchant is a convenience store.

55. The non-transitory computer readable memory medium of claim 52, wherein the program instructions are further executable to:
   upon establishing a network connection to the wide area network, automatically provide a message to the at least one server to start the automatic determination and reception of the plurality of applications.

56. The non-transitory computer readable memory medium of claim 55, wherein the message comprises identification information of the gateway device.

57. The non-transitory computer readable memory medium of claim 52, wherein said determining the plurality of premise devices is performed automatically by the gateway device without receiving user input specifying the plurality of devices.

58. The non-transitory computer readable memory medium of claim 52, wherein said determining the plurality of premise devices comprises receiving user input identifying a premise device of the plurality of premise devices.

59. The non-transitory computer readable memory medium of claim 52, wherein the identification information identifies a type of each premise device.

60. The non-transitory computer readable memory medium of claim 52, wherein the identification information identifies a model of each premise device.

61. The non-transitory computer readable memory medium of claim 52, wherein the indication comprises first identification information of the first premise device coupled to the gateway device, wherein the first application is automatically determined by the at least one server for managing the first premise device coupled to the gateway device using the first identification information of the first premise device.

62. The non-transitory computer readable memory medium of claim 52, wherein the gateway device is located at a home of a user, wherein the plurality of premise devices are located in the home of the user.

63. A method for automatically configuring a gateway device at a location, comprising:
  determining a plurality of premise devices coupled to the gateway device at the location;
  providing an indication of the plurality of premise devices to at least one server over a wide area network, wherein the indication of the plurality of premise devices comprises identification information of each premise device coupled to the gateway device;
  receiving executable instructions of a plurality of applications from the at least one server over the wide area network, wherein the plurality of applications are automatically determined based on the provided indication;
  executing the instructions of the plurality of applications, wherein a first portion of a first application of the plurality of applications is executable to manage a first premise device of the plurality of premise devices at the location, wherein a second portion of the first application is executable by the at least one server to provide a user interface for receiving input for managing the first premise device, wherein the first portion of the first application and the second portion of the first application are designed for distributed execution by the gateway device and the at least one server; and
  receiving, by the first portion of the first application, one or more commands from the at least one server to manage the first premise device, wherein said receiving the one or more commands from the at least one server is performed in response to the at least one server receiving input to the user interface to manage the first premise device.

64. The method of claim 63, further comprising:
  upon establishing a network connection to the wide area network, automatically providing a message to the at least one server to start the automatic determination and reception of the plurality of applications.

65. The method of claim 64, wherein the message comprises identification information of the gateway device.

66. The method of claim 63, wherein said determining the plurality of premise devices is performed automatically by the gateway device without receiving user input specifying the plurality of devices.

67. The method of claim 63, wherein said determining the plurality of premise devices comprises receiving user input identifying a premise device of the plurality of premise devices.

68. The method of claim 63, wherein the gateway device is a merchant gateway device of a merchant located at a merchant location.

69. The method of claim 63, wherein the gateway device is located at a home of a user, wherein the plurality of premise devices are located in the home of the user.

70. The non-transitory computer readable memory medium of claim 18, wherein the gateway device is a merchant gateway device of a merchant located at a merchant location.

71. The non-transitory computer readable memory medium of claim 70, wherein the merchant is a convenience store.

72. A gateway device, comprising:
  a first one or more interfaces for communicating with a plurality of premise devices collocated with the gateway device;
  a second one or more interfaces for communicating with a server over a wide area network (WAN);
  one or more processors;
  one or more memory mediums coupled to the one or more processors, wherein the one or more memory mediums are configured to store applications that are executable by the one or more processors to manage the plurality of premise devices;
  wherein the one or more processors are configured to execute program instructions stored on the one or more memory mediums to:
    detect the plurality of premise devices collocated with the gateway device;
    provide an indication of the plurality of premise devices to a server over the WAN;
    receive executable instructions of a plurality of applications from the server over the WAN, wherein the plurality of applications are automatically determined based on the provided indication, wherein a first portion of a first application of the plurality of applications is executable by the gateway device to manage a first premise device of the plurality of premise devices at the location, wherein a second portion of the first application is installed on and executed by the server, and wherein the first portion of the first application and the second portion of the first application are designed for distributed execution by the gateway device and the server;
    store the executable instructions of the plurality of applications in the one or more memory mediums based on said receiving;
    execute the first portion of the first application to manage the first premise device; and
    receive one or more commands from the second portion of the first application executing on the server to manage the first premise device, wherein said receiving the one or more commands from the server is performed in response to the server executing the second portion of the first application to provide a user interface for managing the first premise device and receive input from a user to manage the first premise device.

73. The gateway device of claim 72, further comprising:
  a modem coupled to the second one or more interfaces, wherein the modem is configured to provide communication capabilities over the WAN.

74. The gateway device of claim 72, wherein the first one or more interfaces comprise one or more of:
  one or more local area network interfaces;
  one or more serial interfaces; or
  a wireless local area network interface.

75. The gateway device of claim 72, further comprising:
  a router, wherein the router is configured to provide a local area network (LAN) for the plurality of premise devices.

76. A gateway device, comprising:
  a first one or more interfaces for communicating with a plurality of premise devices collocated with the gateway device;
  a second one or more interfaces for communicating with a server over a wide area network (WAN);

one or more processors;

one or more memory mediums coupled to the one or more processors, wherein the one or more memory mediums are configured to store applications that are executable by the one or more processors to manage the plurality of premise devices;

wherein the one or more processors are configured to execute program instructions stored on the one or more memory mediums to:

detect the plurality of premise devices collocated with the gateway device;

provide an indication of the plurality of premise devices to at least one server over the WAN;

receive executable instructions of a plurality of applications from the at least one server over the WAN, wherein the instructions of the plurality of applications are automatically determined based on the provided indication, and wherein a first portion of a first application of the plurality of applications is executable by the gateway device to manage a first premise device of the plurality of premise devices at the location, wherein a second portion of the first application is executable by the at least one server to provide a user interface for receiving input for managing the first premise device, wherein the first portion of the first application and the second portion of the first application are designed for distributed execution by the gateway device and the at least one server;

store the instructions of the plurality of applications in the one or more memory mediums based on said receiving;

execute the first portion of the first application to manage the first premise device; and receive, by the first portion of the first application executing on the gateway device, one or more commands from the at least one server to manage the first premise device, wherein said receiving the one or more commands from the at least one server is performed in response to the at least one server receiving input to the user interface to manage the first premise device.

77. The gateway device of claim 76, further comprising:
    a modem coupled to the second one or more interfaces, wherein the modem is configured to provide communication capabilities over the WAN.

78. The gateway device of claim 76, wherein the first one or more interfaces comprise one or more of:
    one or more local area network interfaces;
    one or more serial interfaces; or
    a wireless local area network interface.

79. The gateway device of claim 76, further comprising:
    a router, wherein the router is configured to provide a local area network (LAN) for the plurality of premise devices.

* * * * *